(12) United States Patent
Niu

(10) Patent No.: US 12,196,984 B2
(45) Date of Patent: Jan. 14, 2025

(54) SPLICING DISPLAY APPARATUS FOR FLOATING IMAGE AND MULTI-LAYER DISPLAY DEVICE COMPRISING THE SAME

(71) Applicant: SHANGHAI YUPEI PHOTOELECTRIC TECHNOLOGY LIMITED, Shanghai (CN)

(72) Inventor: Lei Niu, Shanghai (CN)

(73) Assignee: SHANGHAI YUPEI PHOTOELECTRIC TECHNOLOGY LIMITED, Shanghai (CN)

( * ) Notice: Subject to any disclaimer, the term of this patent is extended or adjusted under 35 U.S.C. 154(b) by 0 days.

(21) Appl. No.: 18/408,145

(22) Filed: Jan. 9, 2024

(65) Prior Publication Data

US 2024/0142797 A1 May 2, 2024

Related U.S. Application Data

(63) Continuation of application No. PCT/CN2022/104084, filed on Jul. 6, 2022.

(30) Foreign Application Priority Data

Jul. 9, 2021 (CN) .......................... 202110777951.X

(51) Int. Cl.
*G02B 30/56* (2020.01)
*G02B 27/10* (2006.01)
(Continued)

(52) U.S. Cl.
CPC ........... *G02B 30/56* (2020.01); *G06F 3/1446* (2013.01)

(58) Field of Classification Search
USPC ........................................................ 345/156
See application file for complete search history.

(56) References Cited

U.S. PATENT DOCUMENTS

2015/0205564 A1* 7/2015 Xu ..................... G02F 1/13336
29/825
2017/0163948 A1* 6/2017 Morisawa ................. G06T 5/92
(Continued)

FOREIGN PATENT DOCUMENTS

CN 103048866 A 4/2013
CN 105393295 A 3/2016
(Continued)

OTHER PUBLICATIONS

International Search Report issued for International Patent Application No. PCT/CN2022/104084, Date of mailing: Sep. 22, 2022, 5 pages including English translation.

*Primary Examiner* — Chineyere D Wills-Burns
(74) *Attorney, Agent, or Firm* — HSML P.C.

(57) ABSTRACT

A splicing display apparatus for floating images and a multi-layer display device comprising the same are disclosed. The splicing display apparatus comprises: a display module configured to emit display light constituting a target image. The display module comprises a plurality of display portions arranged at intervals along a first direction. Each display portion is configured to display a corresponding portion of the target image. The splicing display apparatus further comprises a plurality of optical imaging modules configured to receive the display light emitted from the display modules to form a plurality of floating sub-images in the air. Each optical imaging module has an object plane and an image plane. Each of the plurality of display portions is disposed at an object plane of a corresponding optical imaging module of the plurality of optical imaging modules, and the display light emitted from each display portion presents a corresponding floating sub-image at the image plane through the corresponding optical imaging module. The plurality of floating sub-images constitute a complete floating image of the target image, and adjacent floating (Continued)

sub-images of the plurality of floating sub-images have overlapping splicing areas and have the same image content in the splicing areas.

20 Claims, 20 Drawing Sheets

(51) Int. Cl.
*G03B 9/02* (2021.01)
*G06F 3/14* (2006.01)
*G09G 5/00* (2006.01)

(56) References Cited

U.S. PATENT DOCUMENTS

| | | | |
|---|---|---|---|
| 2017/0219864 A1* | 8/2017 | Jepsen | G02F 1/133603 |
| 2017/0262246 A1* | 9/2017 | Guo | G06F 3/1431 |
| 2018/0018931 A1* | 1/2018 | Zhang | G09G 5/397 |
| 2018/0113664 A1* | 4/2018 | Zhao | G06F 3/14 |
| 2019/0356907 A1* | 11/2019 | Iguchi | G02B 30/27 |
| 2022/0208073 A1* | 6/2022 | Wai | G09G 3/2074 |
| 2022/0365364 A1* | 11/2022 | Niu | G02B 17/08 |
| 2023/0341703 A1* | 10/2023 | Niu | G02B 27/0966 |
| 2024/0143262 A1* | 5/2024 | Zhou | G06F 3/04886 |

FOREIGN PATENT DOCUMENTS

| | | |
|---|---|---|
| CN | 105425404 A | 3/2016 |
| CN | 110501818 A | 11/2019 |
| CN | 111522146 A | 8/2020 |

* cited by examiner

SPLICING DISPLAY APPARATUS FOR FLOATING IMAGE AND MULTI-LAYER DISPLAY DEVICE COMPRISING THE SAME

CROSS-REFERENCE TO RELATED APPLICATION(S)

This application claims priority to Chinese Patent Application No. 202110777951.X, filed on Jul. 9, 2021, the content of which is incorporated herein by reference in its entirety.

TECHNICAL FIELD

Embodiments described herein relate generally to optical field three-dimensional display technology, and more particularly to a splicing display apparatus for floating images and a multi-layer display device comprising the splicing display apparatus.

BACKGROUND ART

Among the numerous display technologies, in-air floating display technology has attracted the attention of many researchers because it can present images in the air and bring to the viewer a strong visual impact and a sensory experience that appears both real and imaginary.

There are three main types of floating display technology. The first type is traditional optical lens imaging, such as concave mirror plus splitter structure, which is the earliest proposed scheme of such type of display system. The illuminated real object or the content displayed by LCD is reflected by the beam splitter into the concave mirror, and the light passes through the beam splitter again after the convergence of the concave mirror, and then images on the other side thereof. At this time, the observer can see the image floating in the air. For such technical solution, the imaging size of the floating image is small, and the aberration such as distortion is serious The second type is to use the principle of integrated imaging. This type of scheme is composed of an array of micro-lens and several arrays of image units. The light emitted from the points displaying the same image information in the image unit converge in space through the corresponding micro-lenses to form floating image points The advantage of such type of scheme is that the thickness of the display device is extremely small, which is substantially the thickness of the display. The disadvantage is that the resolution is very low and the cost is high. The third type is to use the "negative refractive index screen" composed of special microstructure for floating imaging, mainly including the following kinds:

Retroreflective Structure plus Beam Splitter: this structure is mainly composed of glass beads or arrays of micro-prism. Such structure can realize the effect that the reflected light and the incident light are parallel to each other in opposite directions. The light emitted by the display source is incident to the retroreflective structure through the beam splitter, and the reflected light passing through the retroreflective structure will pass through the beam splitter again in the opposite direction of the incident light and converge on the other side of the beam splitter for imaging.

Two-layer Mirror Arrays: this scheme is composed of upper and lower layers of mirror arrays and the plane mirror units between the two layers are perpendicular to each other. The light emitted by the display source is reflected by the plane mirror array and then converges on the other side for imaging.

Micro-Boss Structure Array: this scheme is composed of arrays of micro-boss structures. The light emitted by the display source is reflected twice by the micro-boss structures and converges on the other side for imaging.

The advantage of such type of technical solution is that there is no aberration. The disadvantages are the existence of ghost images, the high processing cost on "negative refractive index screen" and the large system volume.

For different scene requirements, the required sizes of floating images are different. In prior art, although the above-mentioned various floating display technologies exist, the original image and the floating image are set in a 1:1 ratio in most floating display apparatuses due to the design limitations of the optical systems for floating display; even in a fraction of magnification systems, the floating image is slightly larger than the original image (e.g. 1.5:1). The reason is that if the greater the magnification is, the more severe the aberrations such as field curvature, distortion and the like are, then more optical correction elements are needed, while generally fewer and more cost-effective optical elements are desired in consideration of cost and size factors, thereby reducing the cost and size of the optical system in the floating display apparatus. Therefore, the size of the floating image displayed by the floating display apparatus is generally defined at the designing stage of the manufacturer and cannot be adjusted during use.

Thus, when a user wishes to present floating images of different sizes according to different application scenes, it is generally necessary to purchase floating display apparatuses of different sizes. For the manufacturer of floating display apparatus, it is necessary to design different floating display apparatuses according to different users' needs (especially design different optical systems to adapt to image display units of different sizes) and adapt them one by one, which consumes a lot of manpower and material resources

SUMMARY

Exemplary embodiments of the present invention aim at overcoming the above-mentioned and/or other problems in the prior art, in particular to provide a splicing display apparatus for floating an image, which includes a plurality of display portions and a plurality of corresponding optical imaging modules to form a floating image spliced by a plurality of floating sub-images in the air, while can have a lower manufacturing cost and a more flexible optical layout.

Specifically, an exemplary embodiment of the present invention provides a splicing display apparatus for floating an image. The splicing display apparatus comprises a display module configured to emit display light constituting a target image. The display module comprises a plurality of display portions arranged at intervals along a first direction. Each display portion is configured to display a corresponding portion of the target image. The splicing display apparatus further comprises a plurality of optical imaging modules configured to receive the display light emitted from the display modules to form a plurality of floating sub-images in the air. Each optical imaging module has an object plane and an image plane. Each of the plurality of display portions is disposed at the object plane of a corresponding optical imaging module of the plurality of optical imaging modules, and the display light emitted from each display portion presents a corresponding floating sub-image at the image plane through the corresponding optical imaging module. The plurality of floating sub-images constitute a complete floating image of the target image, and adjacent floating sub-images of the plurality of floating sub-images have overlapping splicing areas and have the same image content in the splicing areas.

In the splicing display apparatus of the above exemplary embodiment, a plurality of smaller floating sub-images can be formed in the air by a display module having a plurality of display portions and a plurality of corresponding imaging modules, and adjacent floating sub-images have overlapping sections to splice into a complete larger floating image, thereby realizing a large-sized floating display Such splicing display apparatus apparently reduces the cost for realizing floating display of different sizes, since there is no need to design different optical imaging systems for floating images of specific sizes, only needing to select a proper number of display portions and imaging modules according to the required size of the floating image, and an optical element of small size is easier to process than an optical element of large size. In addition, such splicing display apparatus is thinner and lighter than the larger-sized floating display apparatus in the prior art, with significantly reduced thickness.

According to another exemplary embodiment of the present invention, a multi-layer display device is also provided. The multi-layer display device comprises a splicing display apparatus of the above exemplary embodiment and a transparent display apparatus disposed optically downstream of the floating display apparatus. A display plane of the transparent display apparatus is located at a position different from a position of the image plane.

Other characteristics and aspects will become clear through the following detailed description, drawings and claims.

BRIEF DESCRIPTION OF THE DRAWINGS

The invention may be better understood by describing exemplary embodiments of the invention in conjunction with the accompanying drawings, in which.

DETAILED DESCRIPTION

Figure 1:
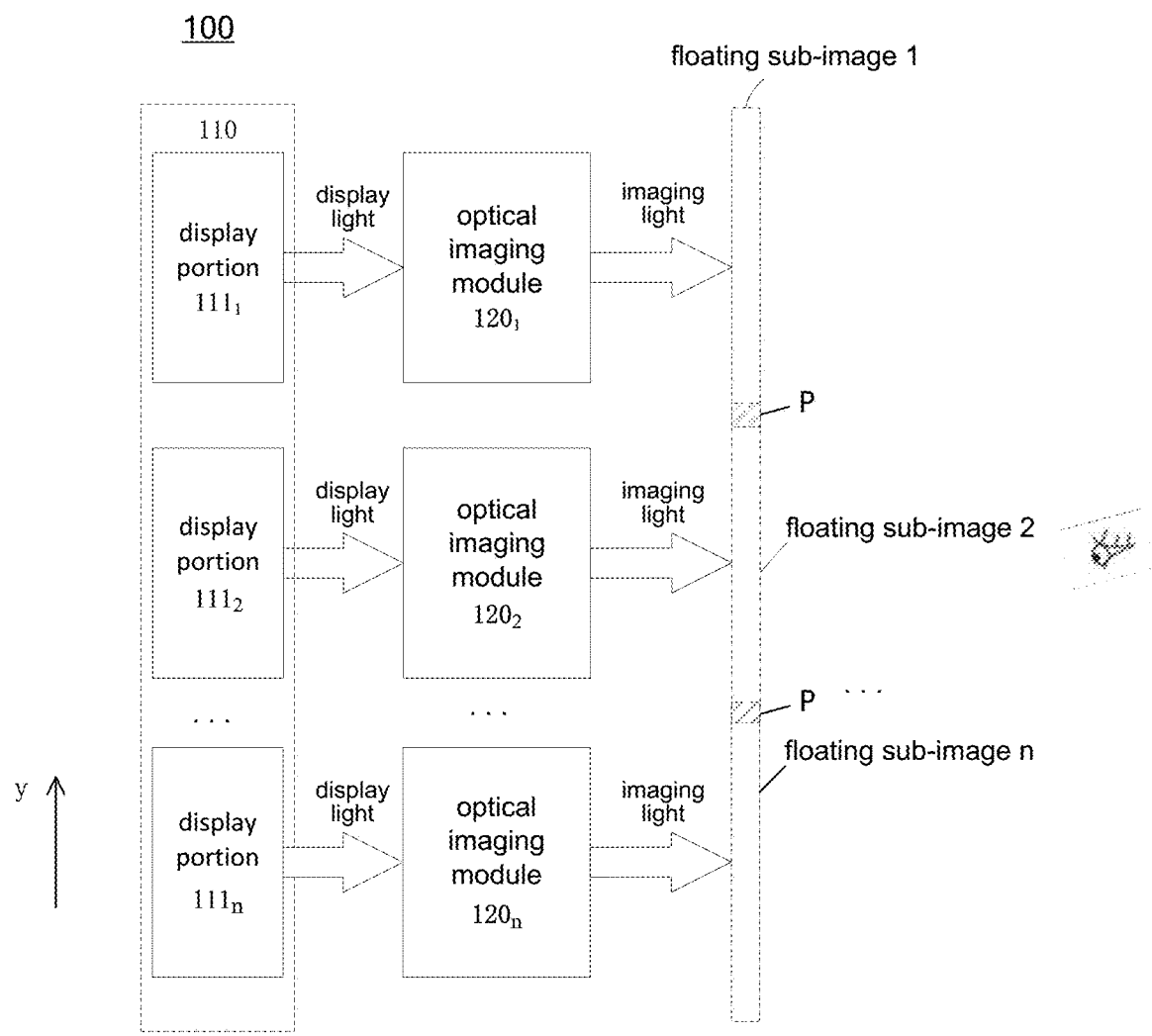
FIG. 1 illustrates a schematic block diagram of a splicing display apparatus 100 for floating an image according to an embodiment of the present invention.

A detailed description of the present invention will be described below, and it should be noted that, in the detailed description of these embodiments, all features of the actual embodiments may not be described in detail in this description for the sake of brevity and conciseness of the description. It should be understood that, in the actual implementation of any one of the embodiments, just as in the process of any engineering project or design project, in order to achieve the developers' specific goals and in order to meet system-related or business-related restrictions, a variety of concrete decisions are often made, and this varies from one implementation to another. In addition, it should also be understood that, although the effort made in such developing process may be complex and time-consuming, some variations such as design, manufacture and production on the basis of the technical contents disclosed in the disclosure are just customary technical means in the art for one of ordinary skilled in the art associated with the technical contents disclosed in the present disclosure, and the present disclosure should not be construed as insufficient disclosure.

Unless otherwise defined, technical or scientific terms used in the claims and the description shall have the ordinary meaning understood by one of ordinary skills in the art to which this invention belongs. "First", "second," and similar terms used in the description and claims of the present invention do not imply any order, quantity, or importance, but are merely used to distinguish different components. "One", "a/an", or similar terms do not imply any quantitative limitation, but rather means "at least one". "Connected", "coupled" and the like are not limited to physical or mechanical connections, nor are they limited to direct or indirect connections. The phrase "A is substantially equal to B" is intended to take into account the manufacturing tolerance, that is, the values of A and B can be within ±10% of each other.

For convenience of description, it can be considered that light propagates along an optical path from an optical "upstream" position to an optical "downstream" position in a light beam. Thus, the relative positions of optical elements in the optical path can also be described with these two terms.

A floating display apparatus generally includes an image display unit and an optical system. The image display unit presents an original image on an object surface of the optical system by means of direct display or indirect projection. The image light then forms a floating image on its image surface through the optical system. If a large-size floating display is intended, it is necessary to process larger optical elements, which will lead to a rapid increase of manufacturing cost and a reduced accuracy of optical elements Accordingly, a splicing display apparatus for floating images is provided, which comprises a plurality of floating image display modules to form a plurality of floating sub-images in space, and a complete floating image is formed by splicing the plurality of floating sub-images. Such technical solution in the meantime enables lower manufacturing cost and makes the floating display apparatus lighter and thinner.

FIG. 1 illustrates a schematic block diagram of a splicing display apparatus 100 for floating an image according to an embodiment of the present invention.

Referring to FIG. 1, the splicing display apparatus 100 according to an embodiment of the present invention may include a display module 110 and a plurality of optical imaging modules $120_{1-n}$. The display module 110 may be configured to emit display light constituting a target image. The display module 110 may include a plurality of display portions $111_{1-n}$ arranged at intervals along the y direction, where n≥2. Each display portion 111 may be configured to display a corresponding portion of the target image. The plurality of optical imaging modules $120_{1-n}$ may be configured to receive display light emitted from the display module 110 to form a plurality of floating sub-images 1~n in the air. Each optical imaging module $120_i$ has an object plane and an image plane. Each display portion $111_i$ of the plurality of display portions is disposed at an object plane of a corresponding optical imaging module 120; of the plurality of optical imaging modules such that display light emitted by each display portion $111_i$ presents a corresponding floating sub-image i at an image plane through the corresponding optical imaging module $120_i$, where 1≤i≤n. The plurality of floating sub-images 1~n constitute a complete floating image of the target image, and adjacent floating sub-images of the plurality of floating sub-images 1~n have overlapping splicing areas P and have the same image content in the splicing areas P. By arranging the splicing areas, the visual angle range of the edge image of the floating sub-image in the Y direction is increased.

In an embodiment of the invention, the plurality of display portions may be different parts of the same display or each may be a separate display. A corresponding portion of the target image displayed on each display portion $111_i$ and a corresponding floating sub-image presented at the image plane of the corresponding optical imaging module $120_i$ may have an inverted imaging relationship in the y direction.

Figure 2:
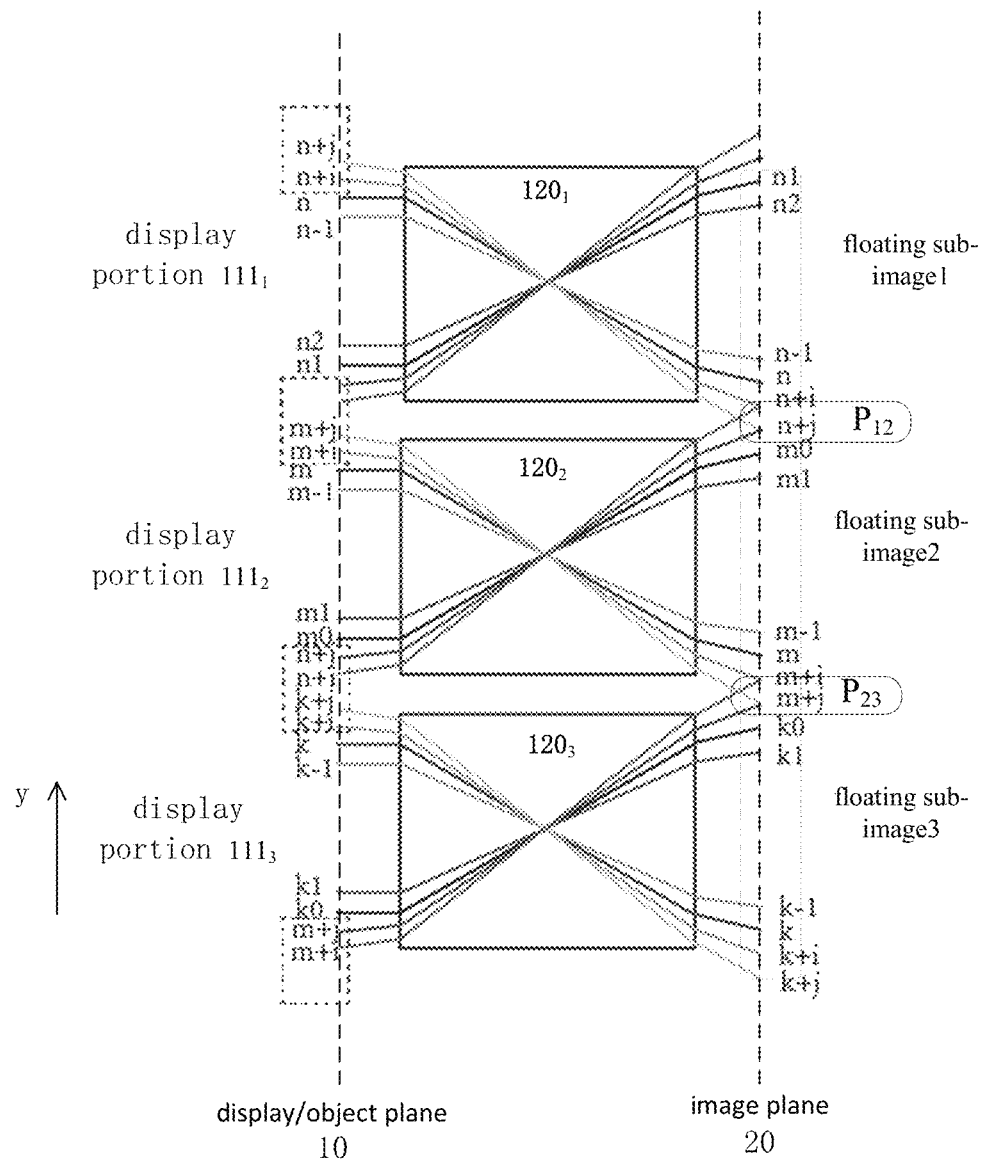
FIG. 2 illustrates an imaging schematic diagram of a plurality of optical imaging modules $120_{1-n}$ in the case of inverted imaging according to an embodiment of the present invention.

FIG. 2 illustrates an imaging schematic diagram of a plurality of optical imaging modules $120_{1-n}$ in the case of inverted imaging according to an embodiment of the present invention. Note that in FIG. 2, for the sake of clarity and conciseness, only three optical imaging modules $120_{1-3}$ are shown. As shown in FIG. 2, the display planes of the display portions $111_{1-3}$ are respectively provided at the object planes 10 of the optical imaging modules $120_{1-3}$, and light emitted from object points on the object planes 10 are imaged in inverted manner on the image planes via the optical imaging modules $120_{1-3}$. The display portions $111_{1-3}$ may be configured respectively to display respective portions (n1~n+j), (n+i, n+j, m0~m+j) and (m+i, m+j, k0~k+j) of the target image (composed of n1~n+j, m0~m+j, k0~k+j in sequence) in a flipping manner in the y-direction. In other words, these portions are displayed on the display planes of the display portions $111_{1-3}$ reversely in the y direction, and are thus inversely imaged to an erect floating sub-image 1 (n1~n+j), an erect floating sub-image 2 (n+i, n+j, m0~m+j) and an erect floating sub-image 3 (m+i, m+j, k0~k+j) via the corresponding optical imaging modules $120_{1-3}$.

Adjacent display portions have repetitive display areas (shown by dashed blocks) imaged on the splicing area $P_{12}$ respectively and have pixel points displaying the same content in their respective repetitive display areas. For example, the repetitive display area near the upper edge of the display portion $111_1$ and the repetitive display area near the lower edge of the display portion $111_2$ are imaged on the same splicing area, and the respective repetitive display areas have pixel points (n+j and n+i) displaying the same content. In this example, the pixel points (n+j and n+i) displaying the same content in the repetitive display areas of the display portion $111_1$ and the display portion $111_2$ are respectively imaged at the same image point within the splicing area $P_{12}$ at the image plane 20 by the corresponding optical imaging modules $120_{1-2}$. Similarly, the repetitive display area near the upper edge of the display portion $111_2$ and the repetitive display area near the lower edge of the display portion $111_3$ are imaged at the splicing area $P_{23}$, and have pixel points (m+j and m+i) displaying the same content in the respective repetitive display areas. Pixel points (m+j and m+i) displaying the same content in the repetitive display areas of the display portion $111_2$ and the display portion $111_3$ are respectively imaged at the same image point within the splicing area $P_{23}$ at the image plane 20 by the corresponding optical imaging modules $120_{2-3}$.

In this way, a complete floating image of the target image (i.e., composed of n1~n+j; m0~m+j; k0~k+j in sequence) can be formed on the image plane 20.

Figure 3:
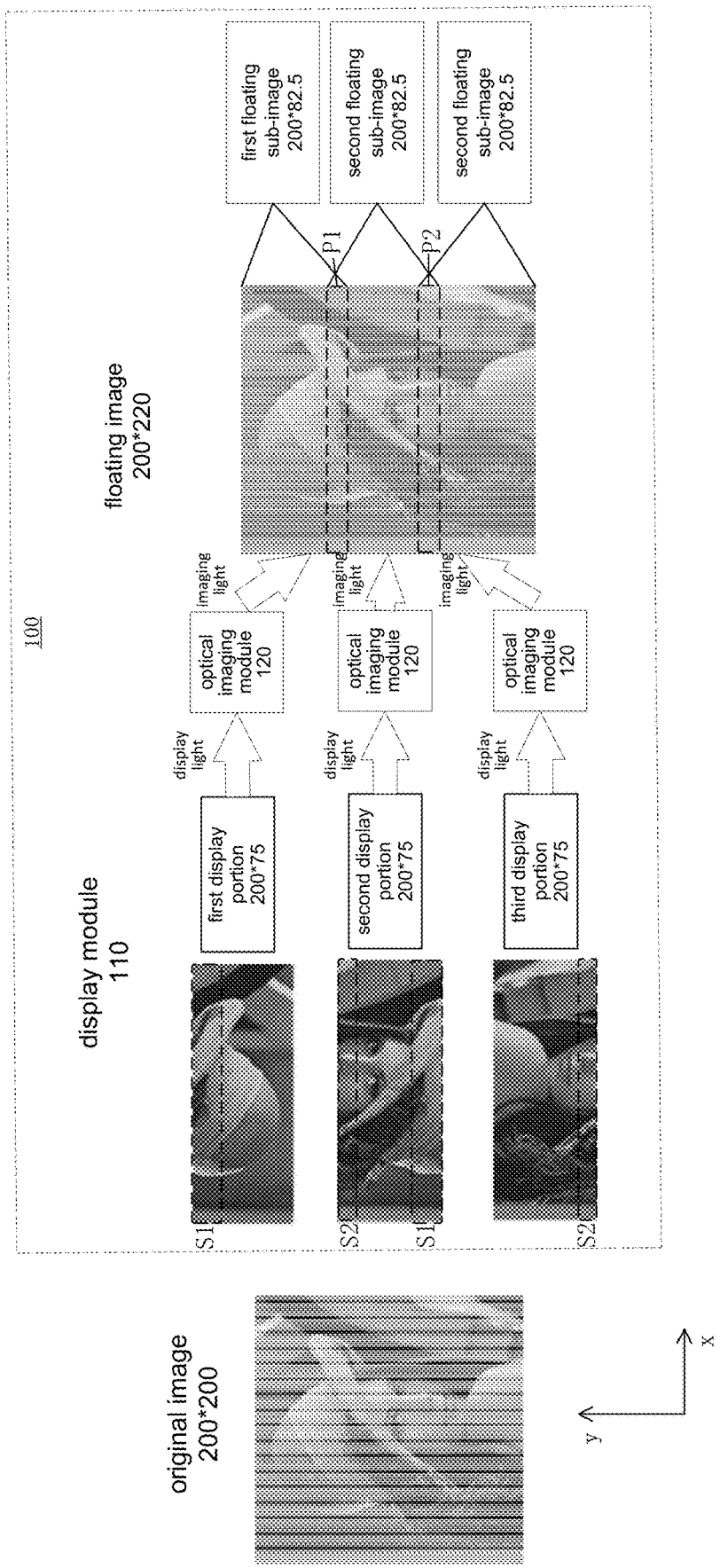
FIG. 3 illustrates an exemplary imaging schematic diagram of a splicing display apparatus 100 for floating an image according to an embodiment of the present invention.

FIG. 3 illustrates an exemplary imaging schematic diagram of a splicing display apparatus 100 for floating images according to an embodiment of the present invention. In this example, the splicing display apparatus 100 may include a display module 110 having three display portions and three optical imaging modules 120 corresponding to the three display portions respectively The original image (200*200 in size, as an example) may be divided into three sub-images (200*75 in size) in the y direction, which have image contents that are partially repeated with each other (indicated by S1 and S2). The first display portion, the second display portion, and the third display portion are configured to display the three sub-images on the object planes of the corresponding optical imaging modules 120 in a flipping manner in the y direction. Display light emitted from the first display portion, the second display portion, and the third display portion is imaged via the optical imaging modules 120 on specific areas on the image planes thereof to form three floating sub-images corresponding to the three sub-images. Sections of adjacent floating sub-images that have repetitive image contents overlap with each other in the splicing area P1 or P2 (P1=S1+S1, P2=S2+S2), thereby forming a complete floating image of the original image.

In the embodiment of the present invention, the plurality of optical imaging modules 120 have no zoom effect in the horizontal direction (x direction) of the image and have a magnification effect in the vertical direction (y direction) of the image. That is, the image height in the x direction is equal to the object height in the x direction, and the image height in the y direction is greater than the object height in the y direction. As shown in FIG. 3, an original image having a size of 200*200 can be imaged to a floating image having a size of 200*220 via the splicing display apparatus 100. Three sub-images having a size of 200*75 are imaged to floating sub-images having a size of 200*82.5, respectively.

Figure 4A:
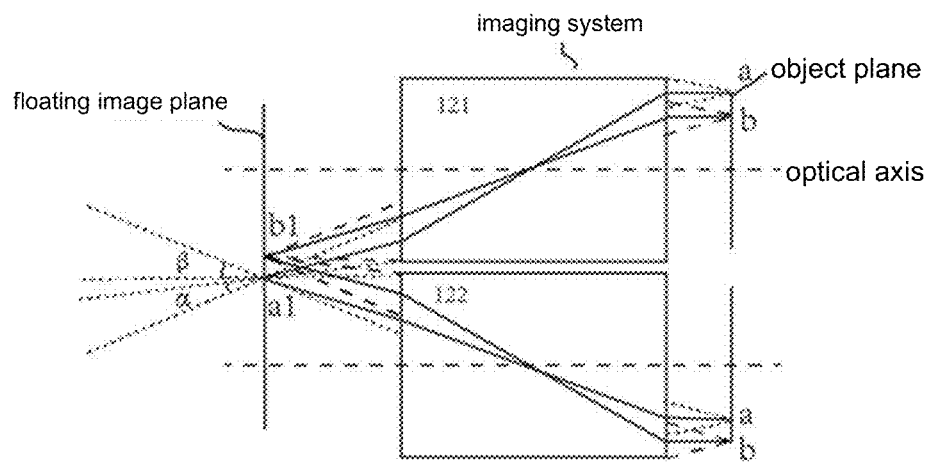
FIG. 4A illustrates a schematic diagram of field angle in y direction of imaging module.

In order to realize seamless splicing of images in the y direction, the image height of the floating sub-image in the y direction needs to be greater than or equal to the maximum physical size of the optical imaging module in the y direction. For the unit imaging module, the floating image point a1 of the pixel point a at the upper edge of the display module in the y direction, which is formed by the optical imaging module 121, only has a lower field angle α, as shown in FIG. 4A. By providing overlapping display areas, the same pixel point a is provided at the lower edge in the lower adjacent display modules, whose floating image point a1 formed by the optical imaging module 122 has an upper field angle β, and the visual angle range of the floating image point a1 is α+β. As such, by arranging overlapping display areas in adjacent display units, and through respective corresponding imaging modules, visual angle splicing for corresponding floating display points can be realized in space, thus increasing the visual angle range of floating image points at the edge of floating sub-images.

In an embodiment of the present invention, the plurality of optical imaging modules 120 may have the same structure. In addition, the amplitude of the visual angle of the splicing area can be adjusted by changing the size of the corresponding repetitive display areas.

The splicing display apparatus 100 for floating images according to an exemplary embodiment of the present invention has been described above. In the apparatus, a plurality of smaller floating sub-images can be formed in the air by a display module having a plurality of display portions and a plurality of corresponding imaging modules, adjacent floating sub-images having overlapping sections to splice into a complete larger floating image, thereby realizing a large-size floating display Such splicing display apparatus 100 apparently reduces the cost for implementing floating display of different sizes, since there is no need to design different optical imaging systems for floating images of specific sizes, only needing to select a proper number of display portions and imaging modules according to the required size of the floating image, and an optical element of small size is easier to process than an optical element of large size. In addition, such splicing display apparatus 100 is thinner and lighter than the larger-sized floating display apparatus in the prior art, with significantly reduced thickness.

It can be understood that since the physical structure and optical characteristics of the optical imaging module can be substantially the same with respect to the x direction, in order to further reduce the size of the optical element so as to facilitate manufacturing, it can also be further spliced by a number of sets of the above-mentioned splicing display apparatuses in the x direction.

Figure 4B:
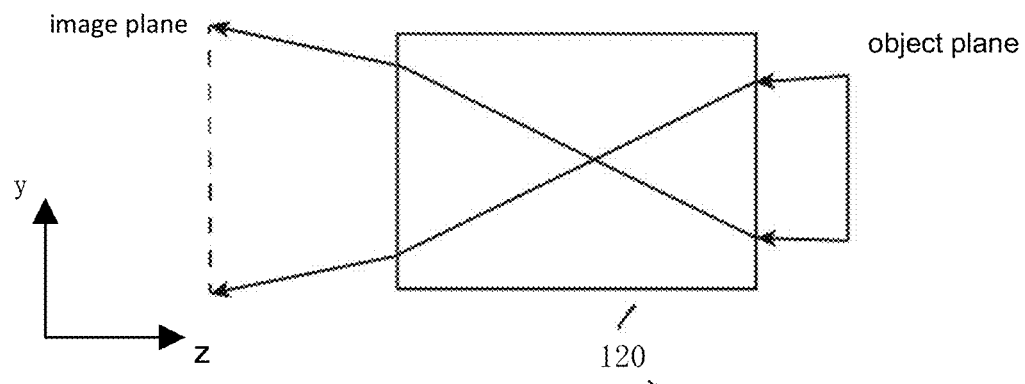
FIG. 4B illustrates a schematic diagram of the principle of propagation of light in the x direction and the y direction, respectively, of an optical imaging module 120 in the splicing display apparatus 100 according to an embodiment of the present invention.
Figure 4B:
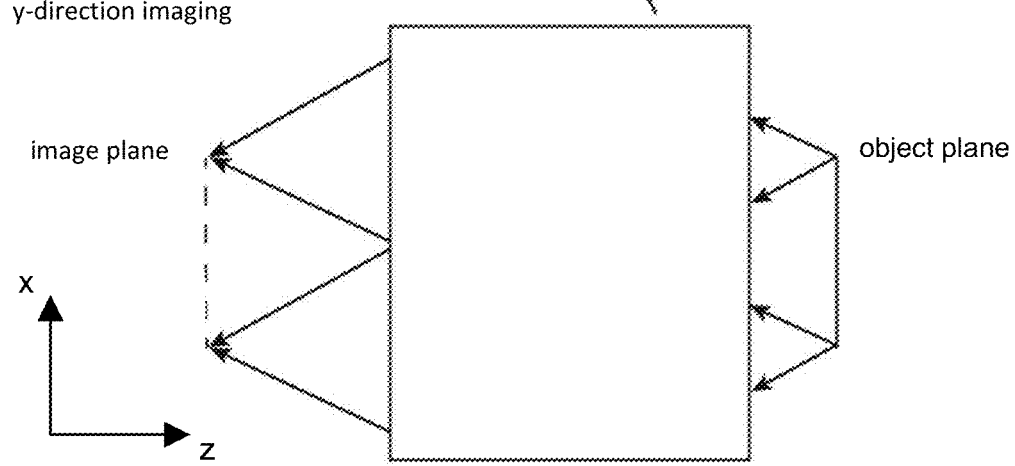

FIG. 4B illustrates a schematic diagram of the principle of propagation of light in the x direction and the y direction, respectively, of an optical imaging module 120 in a splicing display apparatus 100 according to an embodiment of the present invention. In the x direction, the object plane and the image plane are substantially equal in size, and the image-side aperture angle is equal to the object-side aperture angle. In the y direction, the image plane is larger than the object plane, and the image-side aperture angle is smaller than the object-side aperture angle. In the y direction, the image height of the floating sub-image is larger than the maximum physical size of the corresponding optical imaging module 120.

Figure 5A:
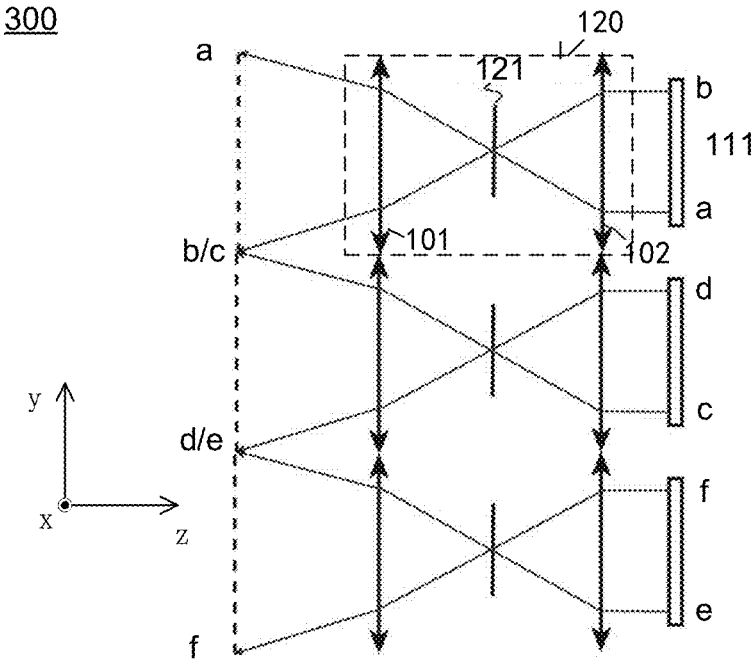
FIG. 5A illustrates a schematic diagram of propagation of light in the y-direction of transmissive configuration of the optical imaging module 120 according to an embodiment of the present invention.
Figure 5B:
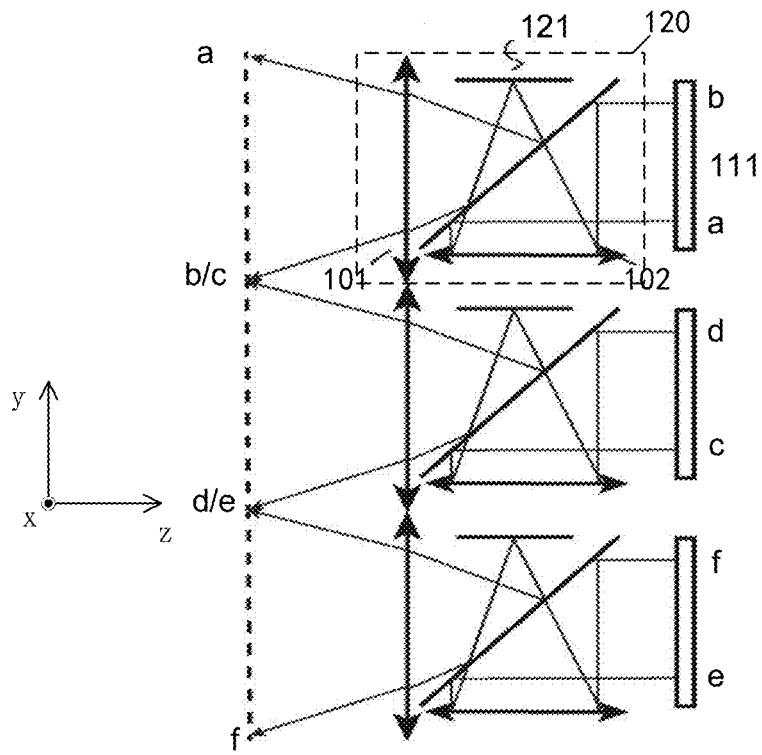
FIG. 5B illustrates a schematic diagram of propagation of light in the y-direction of reflective configuration of the optical imaging module 120 according to an embodiment of the present invention.

FIG. 5A illustrates a schematic diagram of propagation of light in the y-direction of transmissive configuration of the optical imaging module 120 according to an embodiment of the present invention. FIG. 5B illustrates a schematic diagram of propagation of light in the y-direction of reflective configuration of the optical imaging module 120 according to an embodiment of the present invention.

The optical imaging module 120 may include a conjugate imaging element 121 and an imaging assembly. The conjugate imaging element 121 may have a one-dimensional grating structure for imaging in the x direction. The imaging assembly can be used for imaging in the y direction, with its light convergence ability in the y direction greater than that in the x direction. The x-direction and the y-direction may be orthogonal to the optical axis of the optical imaging module 120, respectively.

Figure 5C:
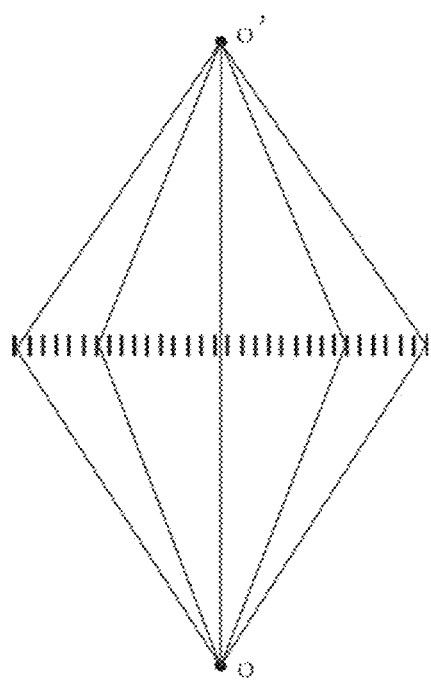
FIG. 5C illustrates an exemplary structure of a one-dimensional grating transmissive array.
Figure 5D:
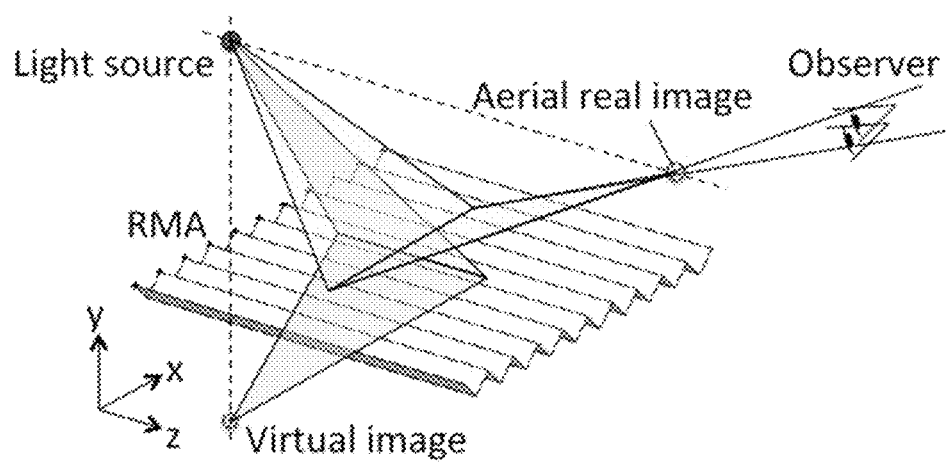
FIG. 5D illustrates an exemplary structure of a one-dimensional retroreflective screen.

The imaging assembly may include a first optical assembly 101 and a second optical assembly 102. As an example, the first optical assembly 101 and the second optical assembly 102 may be cylindrical mirrors, but the present invention is not limited thereto. The conjugate imaging element 121 having a one-dimensional grating structure may be disposed between the first optical assembly 101 and the second optical assembly 102 along the optical axis. The conjugate imaging element 121 may be transmissive (as shown in FIG. 5A) or may be reflective (as shown in FIG. 5B). As an example, the conjugate imaging element 121 may be a one-dimensional retroreflective screen, a one-dimensional grating transmissive array, a one-dimensional holographic grating, or the like. An example of the one-dimensional grating transmissive array structure is shown in FIG. 5C, which may consist of several parallel glass plates adhered together, where the adhered surfaces are coated with reflective films, the object point o is optically conjugated with the image point o', and the object plane and image plane of the structure are equal in size without aberration. An example of the one-dimensional retroreflective screen is shown in FIG. 5D, where a portion of the light illuminated arbitrarily on the surface of the one-dimensional retroreflective screen is reflected at the original angle. The benefit of employing such conjugate imaging element is that the relationship of positions (of the object and the image) is conjugate, the image is not magnified, and there is no aberration. Optionally, in some embodiments of the present invention, the conjugate imaging element may be provided as an aperture stop in the optical imaging module 120. The aperture stop is used to limit the height of light passing through the imaging assembly in the y direction, thereby reducing the imaging aberration in the y direction. In some embodiments of the present invention, the object plane and the image plane of each optical imaging module may be disposed parallel to each other.

Optionally, in some embodiments, one or more of the plurality of display portions 111 are disposed asymmetrically in the y direction with respect to the optical axis of the corresponding optical imaging module 120 such that the formed one or more floating sub-images are asymmetrical in the y direction with respect to the optical axis of the corresponding optical imaging module.

Figure 6:
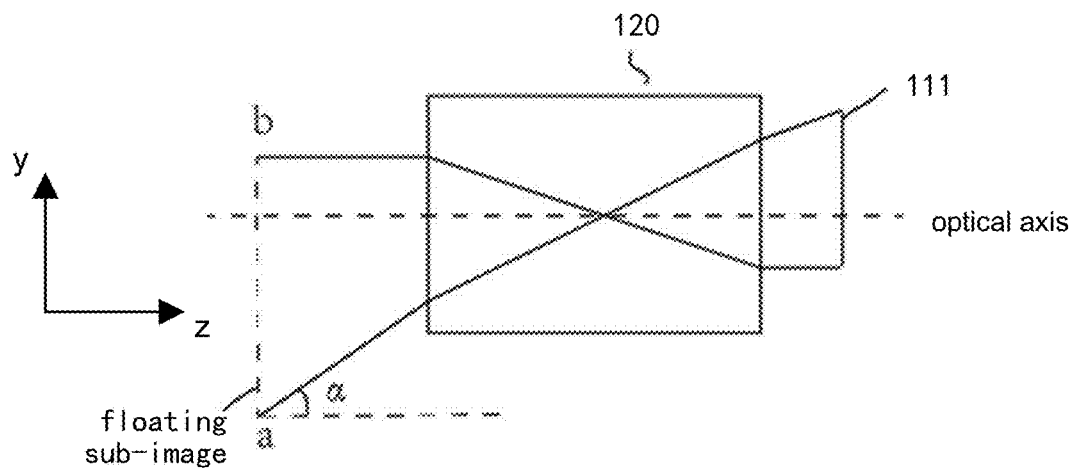
FIG. 6 illustrates a schematic diagram of arrangement of a display portion and a corresponding optical imaging module according to an optional embodiment.

FIG. 6 illustrates a schematic diagram of arrangement of a display portion and a corresponding optical imaging module according to the optional embodiment. As shown in the figure, the display portion 111 (specifically the display plane) may be disposed asymmetrically (biased upward in the figure) in the y direction with respect to the optical axis of the optical imaging module 120. The floating sub-image thus formed is also asymmetrical in the y direction with respect to the optical axis of the optical imaging module 120. In this way, the lower edge image point a of the floating sub-image in the y direction has a larger lower field angle α, whereby the complete visible area of the floating image can be enlarged by such an asymmetric optical design.

In the above optional embodiment, preferably, the numbers of the plurality of display portions 111 and the plurality of optical imaging modules 120 are even. The plurality of display portions 111 are divided into a first group of display portions and a second group of display portions by a central axis. The plurality of optical imaging modules 120 are divided into a first group of optical imaging modules and a second group of optical imaging modules by a central axis. The first group of display portions and the second group of display portions are axially symmetrical with respect to the central axis, and the first group of optical imaging modules and the second group of optical imaging modules are axially symmetrical with respect to the central axis.

Figure 7:
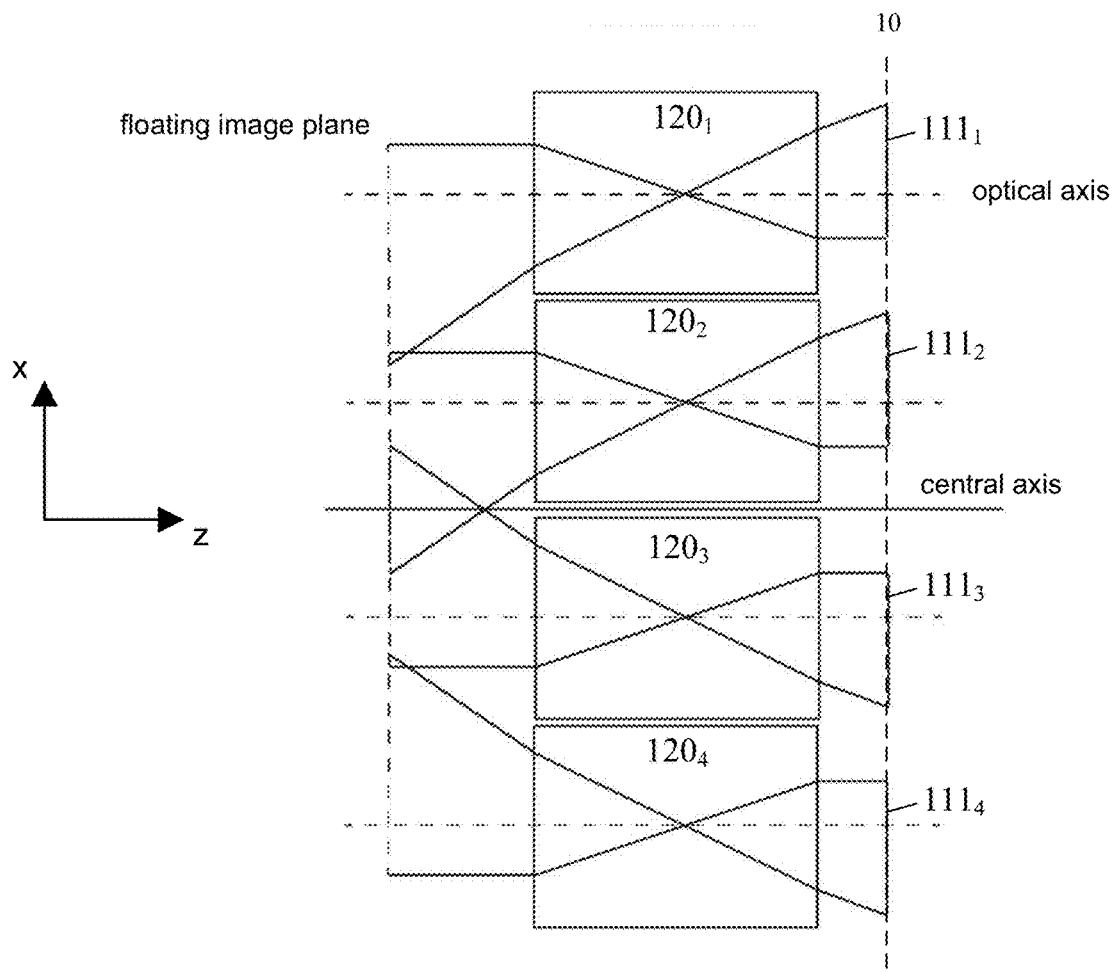
FIG. 7 illustrates a schematic diagram of arrangement of display portions and corresponding optical imaging modules according to a preferred embodiment.

FIG. 7 illustrates a schematic diagram of arrangement of display portions and corresponding optical imaging modules according to the preferred embodiment. FIG. 7 illustrates four display sections $111_{1-4}$ and four optical imaging modules $120_{1-4}$ as an example. The four display portions $111_{1-4}$ are divided into a first group of display portions (display portions $111_1$ and $111_2$ above the central axis) and a second group of display portions (display portions $111_3$ and $111_4$ below the central axis) by a central axis of the system. The four optical imaging modules $120_{1-4}$ are divided by the central axis into a first group of optical imaging modules (optical imaging modules $120_1$ and $120_2$ above the central axis) and a second group of optical imaging modules (optical imaging modules $120_3$ and $120_4$ below the central axis). The first group of display portions and the second group of display portions are provided axially symmetrical with respect to the central axis, i.e., the display portion $111_1$ and the display portion $111_4$ are arranged axially symmetrical with respect to the central axis, and the display portion $111_2$ and the display portion $111_3$ are arranged axially symmetrical with respect to the central axis. The first group of optical imaging modules and the second group of optical imaging modules are provided axially symmetrical with respect to the central axis, i.e. the optical imaging module $120_1$ and the optical imaging module $120_4$ (in particular the optical arrangement therein) are arranged axially symmetrical with respect to the central axis, and the optical imaging module $120_2$ and the optical imaging module $120_3$ are arranged axially symmetrical with respect to the central axis. In this preferred embodiment, each of the display portions and optical imaging modules is asymmetrically designed, and the maximum lower field angle of the lower edge pixel point of the floating sub-image in the y direction is larger than the maximum upper field angle of the upper edge pixel point of the floating sub-image in the y direction. Each point on the display plane 10 emits light, and the intersecting area in space is a visible area where the human eye can view the floating image completely, as shown by the shaded area in FIG. 8, and the floating image is spatially located between the visible area and the display plane. This design not only ensures the symmetry of the visual angle in the y direction, but also makes the visual angle shift to the center of the system, which is helpful in enlarging the complete visual area of the floating image.

Figure 8:
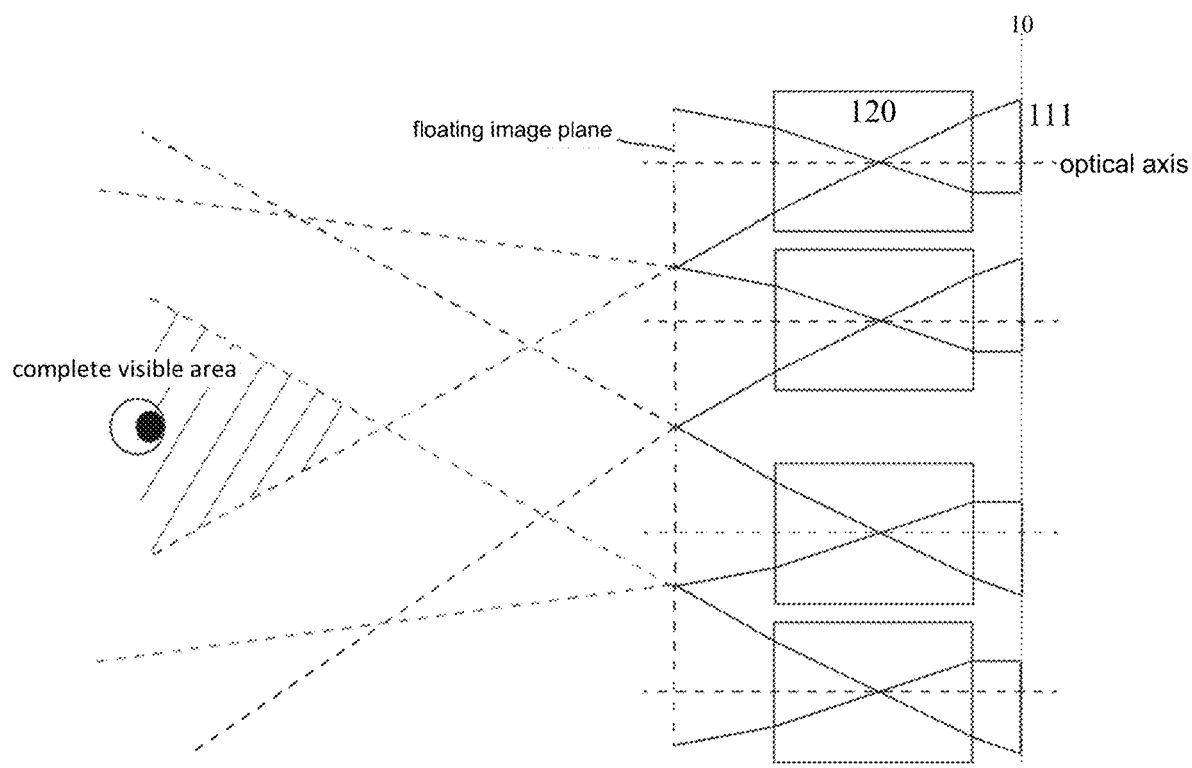
FIG. 8 illustrates a schematic diagram of complete visible area of display portions and optical imaging modules according to a preferred embodiment.
Figure 9:
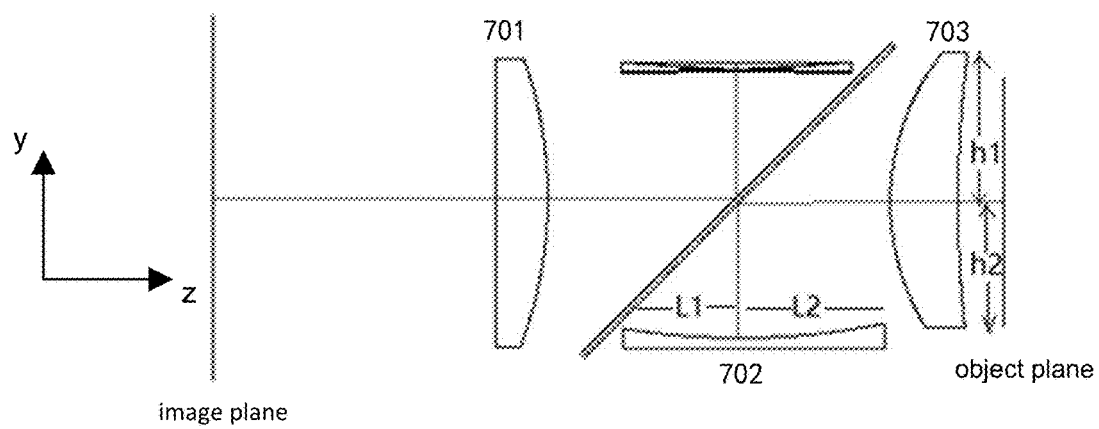
FIG. 9 illustrates a schematic diagram of asymmetric design of optical elements in an optical imaging module according to an optional embodiment.

In the embodiments of FIGS. 7 and 8, the optical elements in the optical imaging module 120 may be asymmetrically designed. For example, FIG. 9 shows an exemplary optical arrangement in the optical imaging module 120, where the optical element 702 is asymmetrically designed, i.e. L1<L2, and the optical element 703 is also asymmetrically designed, i.e. h1>h2, with respect to the main optical axis.

Several examples of optical imaging modules in a splicing display apparatus according to embodiments of the present invention will be described in the following.

First Example

Figure 10:
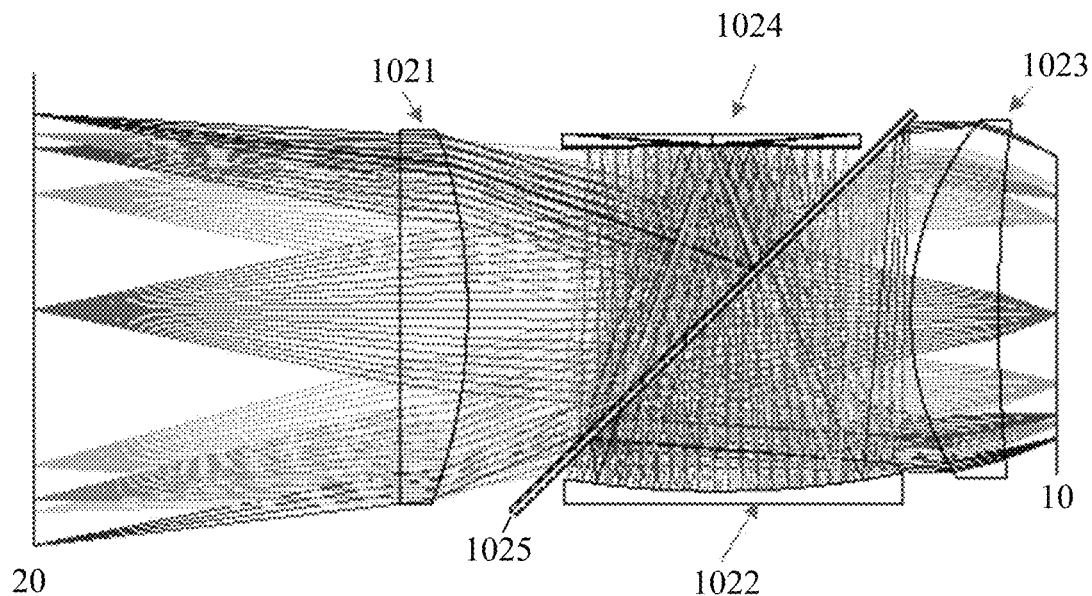
FIG. 10 illustrates a schematic diagram of an optical imaging module 1020 and propagation of light in the y-z plane according to a first example of the present invention.

FIG. 10 illustrates a schematic diagram of an optical imaging module 1020 and propagation of light in the y-z plane according to a first example of the present invention. Several details of the optical imaging module 1020 in the splicing display apparatus according to the first example are identical to those of the optical imaging module 120 as described above with respect to FIGS. 1-5B, and will not be repeated herein. The special features of the optical imaging module 1020 of the first example are mainly described below.

Figure 11:
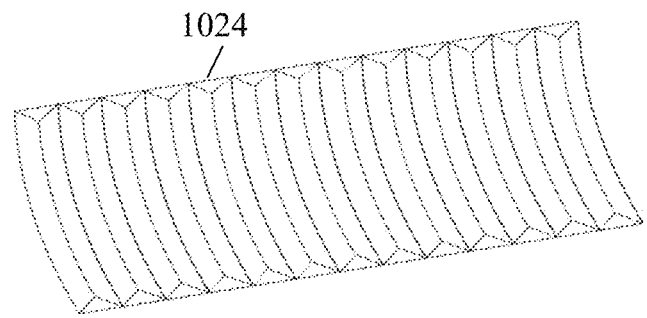
FIG. 11 illustrates an exemplary structure of cylindrical serrated grating.

Referring to FIG. 10, the optical imaging module 1020 includes a first cylindrical mirror 1021, a second cylindrical mirror 1022, a third cylindrical mirror 1023, a cylindrical serrated grating 1024, and a beam splitting plate 1025. The cylindrical serrated grating 1024 may be manufactured by integrally forming a one-dimensional optical element (e.g., a cylindrical mirror) and a conjugate imaging element having a one-dimensional grating structure (e.g., a one-dimensional retroreflective screen, with a portion of the light illuminated arbitrarily on the surface of the one-dimensional retroreflective screen being reflected at the original angle). The cylindrical serrated grating 1024 has a curved surface on the y direction and a one-dimensional serrated structure on the x direction which is an isosceles triangular structure with a vertex angle of 90 degrees, as shown in FIG. 11.

The first cylindrical mirror 1021 may be a cylindrical convex lens, which is disposed between the object plane 10 and the image plane 20 and has its convex surface facing the object plane. The second cylindrical mirror 1022 is a concave mirror with its concave surface facing the cylindrical serrated grating 1024. The beam splitting plate 1025 is disposed obliquely (for example, at 45° to the optical axis)

between the object plane 10 and the first cylindrical mirror 1021, and between the cylindrical serrated grating 1024 and the second cylindrical mirror 1022. The third cylindrical lens 1023 may be a meniscus lens, which is disposed between the beam splitting plate 1025 and the object plane 10 and has its convex surface facing the beam splitting plate 1025.

The first cylindrical lens 1021 and the cylindrical serrated grating 1024 may constitute the first optical assembly 101 described above. The cylindrical serrated grating 1024 is provided as a cylindrical mirror in the y direction to partly share in the focal power, so that the focal length of the first cylindrical lens 1021 is not too short, and it is easier to manufacture using material with low refractive index such as PC or PMMA. The second cylindrical mirror 1022 and the third cylindrical lens 1023 may constitute the second optical assembly 102 described above. The function of the third cylindrical lens 1023 is mainly to correct the field curvature, balance the optical paths of the center and edge images, and improve the display definition of the floating image.

When the display portion 111 (i.e., the display plane) of the display module 110 is disposed or relayed to the object plane 10 of the optical imaging module 1020, the light emitted from the display plane is modulated by the third cylindrical lens 1023, reflected by the beam splitting plate 1025 and irradiated onto the second cylindrical mirror 1022, reflected back to the beam splitting plate 1025 by the second cylindrical mirror 1022, transmitted from the beam splitting plate 1025 onto the cylindrical serrated grating 1024, reflected back to the beam splitting plate 1025 by the cylindrical serrated grating 1024, and reflected to the first cylindrical lens 1021, and finally emitted from the first cylindrical lens 1021 to form a floating image on the image plane. As described above, the light emitted from the same object point is imaged on the image plane 20 through the cylindrical serrated grating 1024 in the x direction, and is imaged on the same point on the image plane 20 through the third cylindrical mirror 1023, the second cylindrical mirror 1022, the cylindrical serrated grating 1024 and the first cylindrical mirror 1021 in sequence in the y direction.

In this way, the points on the display portion 111 are imaged in the x direction by the optical imaging module 1020. Since imaging is performed by the one-dimensional conjugate imaging element, there is no aberration and no image magnification, and the image-side aperture angle is substantially equal to the object-side aperture angle, a large image-side aperture angle is easily obtained, and the binocular parallax condition is satisfied, thereby forming a floating image at the image plane 20. The points on the display portion 111 are imaged in the y direction by the optical imaging module 1020, and the image-side aperture angle is made relatively small by setting the size of the aperture stop in the y direction (the aperture stop is a cylindrical serrated grating in this embodiment), so that high imaging quality is obtained in the case that the observation range is satisfied, meanwhile the image magnification effect is acquired.

Figure 12:
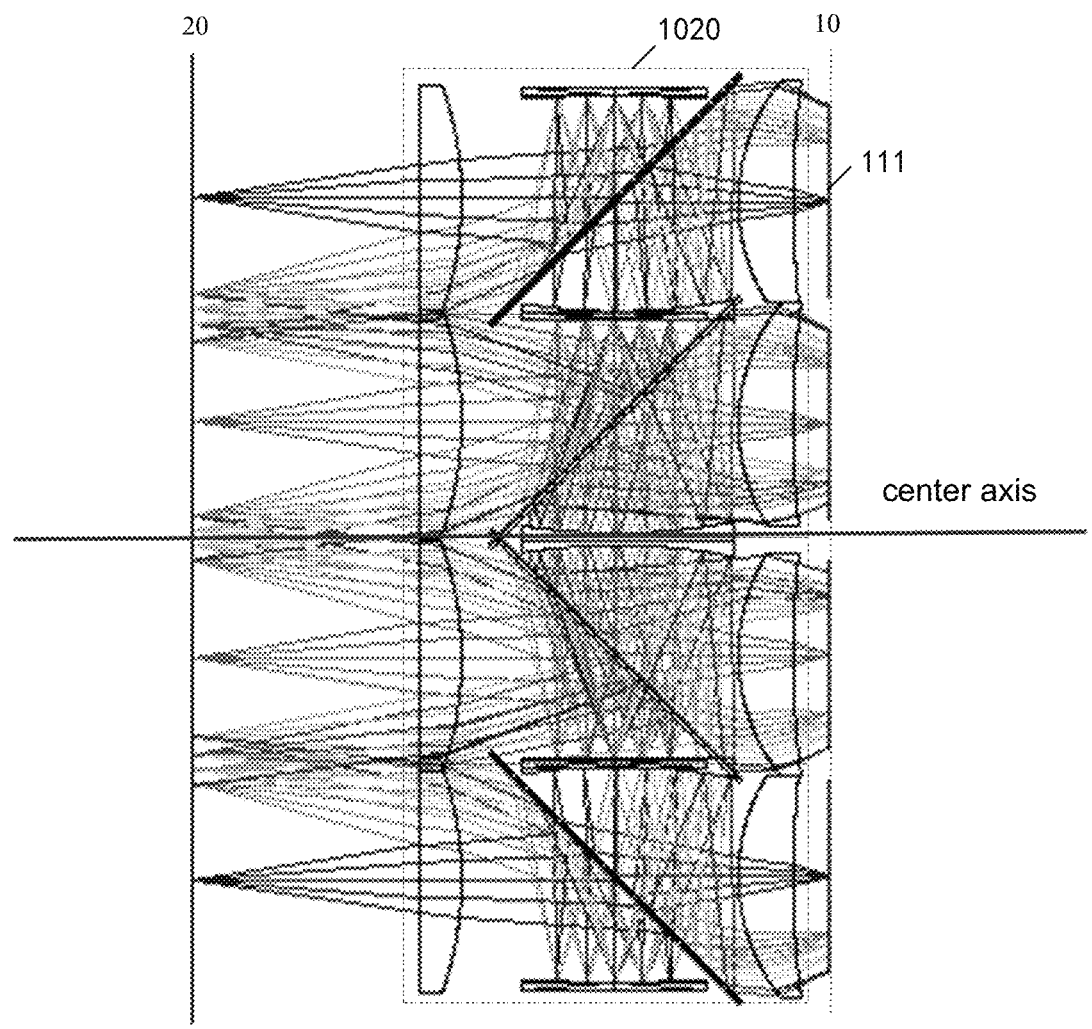
FIG. 12 illustrates an exemplary splicing display system 1200 including four display portions 111 and four optical imaging modules 1020.

FIG. 12 illustrates an exemplary splicing display system 1200 including four display portions 111 and four optical imaging modules 1020. In this example, the upper two display portions 111 and the lower two display portions 111 are disposed axially symmetrical with respect to the central axis, and the upper two optical imaging modules 1020 and the lower two optical imaging modules 1020 are disposed axially symmetrical with respect to the central axis In each optical imaging module 1020, the optical element(s) may be asymmetrically designed.

Second Example

Figure 13:
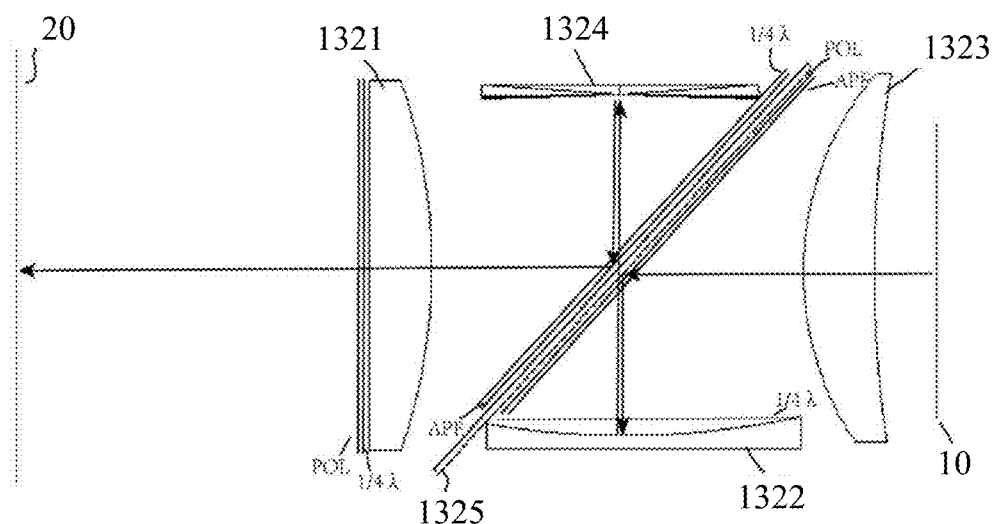
FIG. 13 illustrates a schematic diagram of an optical imaging module 1320 and propagation of light in the y-z plane according to a second example of the present invention.

FIG. 13 illustrates a schematic diagram of an optical imaging module 1320 and propagation of light in the y-z plane according to a second example of the present invention. Several details of the optical imaging module 1320 in the splicing display apparatus according to the second example are identical to those of the optical imaging module 1020 as described above with respect to FIG. 10, and will not be repeated herein. The special features of the optical imaging module 1320 of the second example are mainly described below.

In this example, as shown in FIG. 13, in addition to the first cylindrical mirror 1321, the second cylindrical mirror 1322, the third cylindrical mirror 1323, the cylindrical serrated grating 1324 and the beam splitting plate 1325, the optical imaging module 1320 further includes: polarizing beam splitting films APF respectively disposed on both sides of the beam splitting plate 1325, having an inclination substantially consistent with the beam splitting plate 1325 (for example, 45°); a first polarizer POL disposed between the polarizer APF on the side of the beam splitting plate 1325 facing the third cylindrical mirror 1323 and the beam splitting plate 1325, having an inclination substantially consistent with the beam splitting plate 1325 (for example, 45°); a second polarizer POL disposed between the first cylindrical mirror 1321 and the image plane 20; a first ¼ λ wave plate disposed on the light incoming side of the second cylindrical mirror 1322; a second ¼ λ wave plate disposed obliquely between the polarization beam splitting film APF on the side of the beam splitting plate 1325 facing the first cylindrical mirror 1321 and the first cylindrical mirror 1321 (and the cylindrical serrated grating 1324); and a third ¼ λ wave plate disposed between the second polarizer POL and the first cylindrical mirror 1321.

The display portion 111 (i.e., the display plane) of the display module 110 may be disposed at or relayed to the object plane 10 of the optical imaging module 1320 and configured to emit s-polarized image light, which is irradiated on the beam splitting plate 1325 through the third cylindrical lens 1323, reflected by the polarization beam splitting film APF, irradiated downward onto and reflected by the second cylindrical mirror 1322, passing through the ¼ λ wave plate twice, and converted into p-light from s-light. The p-light passes through the beam splitting plate 1325 and the second ¼ λ wave plate, irradiated onto and reflected by the cylindrical serrated grating 1324, converted into s-polarized light after passing through the second ¼ λ wave plate again, reflected by the polarization beam splitting film APF, passing through the second ¼ λ wave plate for the third time, becoming circularly polarized light. The circularly polarized light passes through the first cylindrical mirror 1321 and then passes through the third ¼λ wave plate to become linearly polarized light. The linearly polarized light passes through the second polarizer POL to be emitted, forming a floating image on the image plane. With this arrangement, the optical efficiency of the imaging optical module can be effectively improved. In particular, the second polarizer POL and the third ¼ λ wave plate on the light output side of the first cylindrical mirror 1321 form a circular polarizer for eliminating the reflected light of external light. In the present embodiment, the absorption axes of the second polarizer and the first polarizer are configured orthogonally, so as to prevent the display light from directly being emitted through the third cylindrical mirror (1323) and the first cylindrical mirror (1321) and being observed by human eyes to form a ghost image

Third Example

Figure 14:
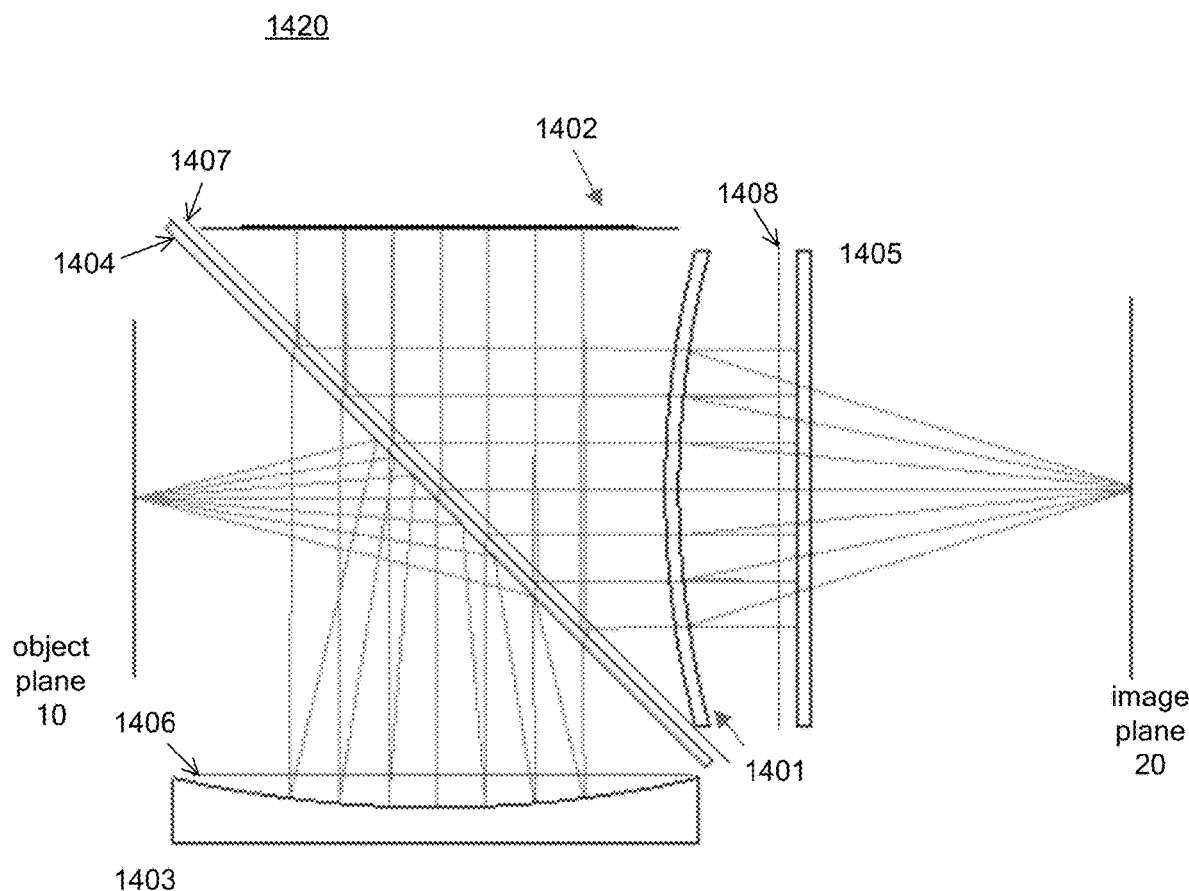
FIG. 14 illustrates a schematic diagram of an optical imaging module 1420 and propagation of light in the y-z plane according to a third example of the present invention.

FIG. 14 illustrates a schematic diagram of an optical imaging module 1420 and propagation of light in the y-z plane according to a third example of the present invention. Several details of the optical imaging module 1420 according to the third example are identical to those of the optical imaging module 120 as described above with respect to FIGS. 1-5B, and will not be repeated herein. The special features of the optical imaging module 1420 of the third example are mainly described below.

In this example, the optical imaging module 1420 may include a first concave mirror 1401 (first optical assembly), a one-dimensional retroreflective screen 1402 (conjugate imaging element and aperture stop), a second concave mirror 1403 (second optical assembly), a first beam splitting plate 1404 and a second beam splitting plate 1405. The first concave mirror 1401 is arranged between the object plane 10 and the image plane 20, having its concave surface facing the image plane 20. The first concave mirror may be of equal thickness and coated with a 50/50 beam splitting film. The concave surface of the second concave mirror 1403 faces the one-dimensional retroreflective screen 1402. The first beam splitting plate 1404 is obliquely positioned between the object plane 10 and the first concave mirror 1401 and between the one-dimensional retroreflective screen 1402 and the second concave mirror 1403. The beam splitting plate is disposed between the first concave mirror 1401 and the image plane 20.

Optionally, the first beam splitting plate 1404 may be a polarizing beam splitting film, and the second beam splitting plate 1405 may be a polarizing beam splitting plate. In this case, the optical imaging module 1410 may also include a first quarter wave plate 1406, a second quarter wave plate 1407, and a third quarter wave plate 1408. In particular, the conjugate imaging element and the aperture stop are integrated into a single component, i.e., the one-dimensional retroreflective screen 1402. That is, the one-dimensional retroreflective screen 1402 also functions as an aperture stop. The first quarter wave plate 1406 may be disposed between the second concave mirror 1403 and the polarizing beam splitting film, the second quarter wave plate 1407 may be disposed between the one-dimensional retroreflective screen 1402 and the polarizing beam splitting film, and the third quarter wave plate 1408 may be disposed between the first concave mirror 1401 and the polarizing beam splitting plate. The second quarter wave plate 1407 may be obliquely disposed in the same manner as the first beam splitting plate 1404. The optical axes of the first quarter wave plate 1406 and the third quarter wave plate 1408 are arranged orthogonally.

When the display portion 111 is disposed at or relayed to the object plane of the optical imaging module 1420, the s-polarized light emitted from the display plane is reflected by the polarizing beam splitting film and irradiated onto the second concave mirror 1403, and the light reflected by the second concave mirror 1403 is converted to p-polarized light through the first ¼ wave plate 1406 and transmitted through the polarizing beam splitting film and the second ¼ wave plate 1407 onto the one-dimensional retroreflective screen 1402; the light is reflected by the one-dimensional retroreflective screen 1402 and passes through the second ¼ wave plate 1407 again to be converted to s-polarized light, and reflected by the polarizing beam splitting film; the light reflected by the polarizing beam splitting film is again irradiated onto the first concave mirror 1401 through the second ¼ wave plate 1407, and a portion of the light is irradiated onto the third ¼ wave plate 1408 through the first concave mirror 1401, the light being still s-polarized light after passing through the third ¼ wave plate 1408, and being reflected by the polarizing beam splitting plate; the light reflected by the polarizing beam splitting plate is irradiated onto the first concave mirror 1401 to be reflected again, and becomes p-polarized light after passing through the third ¼ wave plate 1408, and being emitted through the polarizing beam splitting plate to form a floating image at the image plane 20 in the air.

Note that the use of the polarizing beam splitting film, the polarizing beam splitting plate, the first quarter wave plate 1406, the second quarter wave plate 1407 and the third quarter wave plate 1408 is intended to improve the optical efficiency of the optical imaging module while eliminating impact of unwanted light (e.g., external light), but is not necessary, as those skilled in the art can appreciate that an optical imaging module without use of these optical elements is also sufficient for achieving the objective of forming a floating image.

In this way, points on the display portion 111 that are imaged through the optical imaging module 1420 along the x-direction have a relatively large image-side aperture angle, satisfying the binocular parallax condition, whereby a floating image can be formed at the image plane 20. Points on the display plane of the display portion 111 that are imaged through the optical imaging module 1420 along the y-direction have a relatively small image-side aperture angle, to obtain high imaging quality. The optical imaging module 1420 is a purely reflective structure with no chromatic aberration, making it easy to achieve large-size production.

Fourth Example

Figure 15:
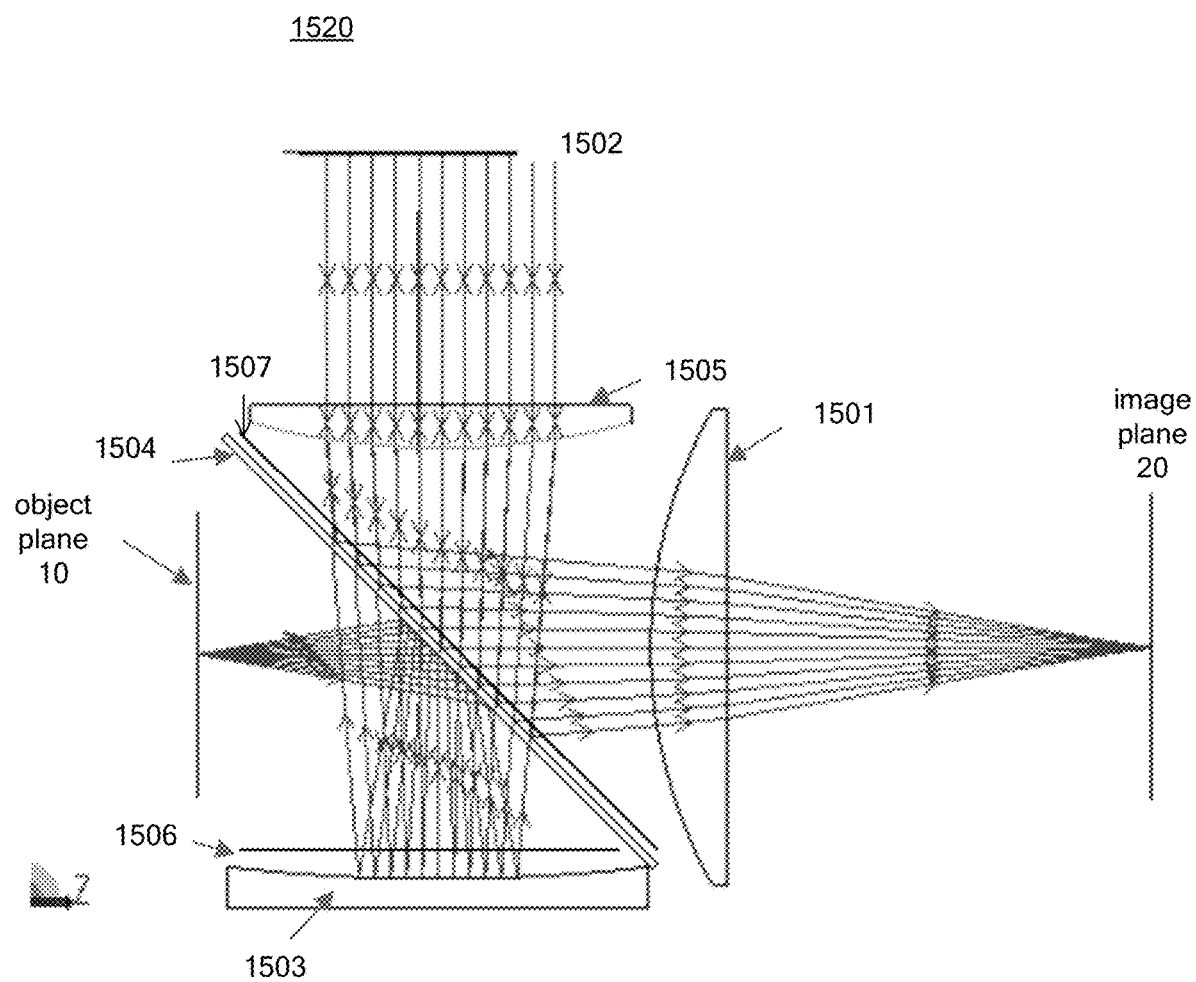
FIG. 15 illustrates a schematic diagram of an optical imaging module 1520 and propagation of light in the y-z plane according to a fourth example of the present invention.

FIG. 15 illustrates a schematic diagram of an optical imaging module 1520 and propagation of light in the y-z plane according to a fourth example of the present invention. Several details of the optical imaging module 1520 according to the fourth example are identical to those of the optical imaging module 120 as described above with respect to FIGS. 1-5B and those of the optical imaging module 1410 as described above with respect to FIG. 14, which will not be repeated herein. The special features of the optical imaging module 1520 of the fourth example are mainly described below.

In this example, the optical imaging module 1520 may include a convex lens 1501, a one-dimensional retroreflective screen 1502 (conjugate imaging element and aperture stop), a concave mirror 1503, a beam splitting mirror 1504 and a correction lens 1505. The convex lens 1501 is arranged between the object plane 10 and the image plane 15, with its convex surface facing the object plane 10. The concave surface of the concave mirror 1503 faces the one-dimensional retroreflective screen 1502. The beam splitting mirror 1504 is obliquely disposed between the object plane 10 and the convex lens 1501 and between the one-dimensional retroreflective screen 1502 and the concave mirror 1503. The correction lens 1505 is disposed between the beam splitting mirror 1504 and the one-dimensional retroreflective screen 1502 for correcting the aberration of the optical imaging module 1510. The correction lens 1505 may be a positive lens or a negative lens. In this example, the convex lens 1501 and the correction lens 1505 constitute the first optical assembly, while the concave mirror 1503 and the correction lens 1505 constitute the second optical assembly. In other words, in this example, the correction lens 1505 may be used as both an optical element in the first optical assembly and an optical element in the second optical assembly.

Optionally, the beam splitting mirror 1504 may be a polarizing beam splitting film; in this case, the optical imaging module 1510 may also include a first quarter wave plate 1506 and a second quarter wave plate 1507. In particular, the conjugate imaging element and the aperture stop are integrated into a single component, i.e., the one-dimensional retroreflective screen 1502. That is, the one-dimensional retroreflective screen 1502 also functions as the aperture stop as described above.

When the display portion 111 is disposed at or relayed to the object plane of the optical imaging module 1520, the s-polarized light emitted from the display plane is reflected by the polarizing beam splitting film and is irradiated onto the concave mirror 1503; the light reflected by the concave mirror 1503 is converted to p-polarized light after passing through the first quarter wave plate 1506 for a second time, and is transmitted through the polarizing beam splitting film and the second quarter wave plate 1507 onto the correction lens 1505; the light passing through the correction lens 1505 is reflected by the one-dimensional retroreflective screen 1502 to pass through the correction lens 1505 again, and is converted to s-polarized light after passing through the second quarter wave plate 1507, and is reflected by the polarizing beam splitting film; the light reflected by the polarizing beam splitting film converges at the image plane 20 in the air through the convex lens 1501 to form a floating image.

Note that the use of the polarizing beam splitting film, the first quarter wave plate 1506 and the second quarter wave plate 1507 is intended to improve the optical efficiency of the optical imaging module while eliminating impact of unwanted light (e.g., external light), but is not necessary, as those skilled in the art can appreciate that an optical imaging module without use of these optical elements is also sufficient for achieving the objective of forming a floating image.

In this way, points on the display portion 111 that are imaged through the optical imaging module 1520 along the x-direction have a relatively large image-side aperture angle, satisfying the binocular parallax condition, whereby a floating image can be formed at the image plane 20. Points on the display portion 111 that are imaged through the optical imaging module 1520 along the y-direction have a relatively small image-side aperture angle to obtain high imaging quality.

In the above third and fourth examples, the optical imaging module 1420 or 1520 may have a symmetrical structure, and the one-dimensional retroreflective screen 1402 or 1502 in the conjugate imaging element is located at an middle position of the optical imaging module 1420 or 1520, i.e. the optical path between the conjugate imaging element and the object plane is substantially equal to the optical path between the conjugate imaging element and the image plane.

Fifth Example

Figure 16:
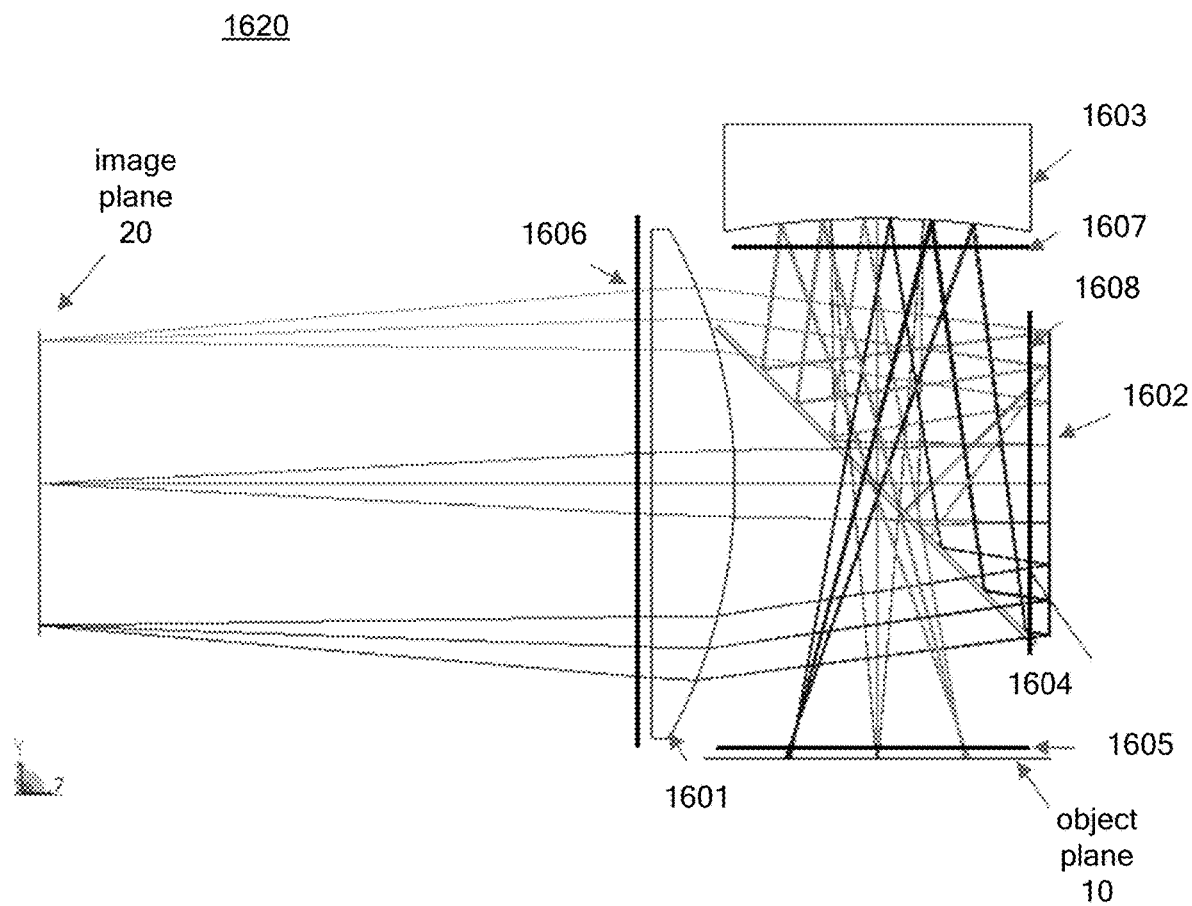
FIG. 16 illustrates a schematic diagram of an optical imaging module 1620 and propagation of light in the y-z plane according to a fifth example of the present invention.

FIG. 16 illustrates a schematic diagram of an optical imaging module 1620 and propagation of light in the y-z plane according to a fifth example of the present invention. Several details of the optical imaging module 1620 according to the fifth example are identical to those of the optical imaging module 120 as described above with respect to FIGS. 1-5B, and will not be repeated herein. The special features of the optical imaging module 1620 of the fifth example are mainly described below.

In this example, the optical imaging module 1620 may include a plano-convex cylindrical mirror 1601 (first optical assembly), a serrated grating 1602 (conjugate imaging element), a cylindrical concave mirror 1603 (second optical assembly and aperture stop), a polarizing beam splitting plate 1604, a first polarizer 1605, a second polarizer 1606, a first quarter wave plate 1607 and a second quarter wave plate 1608. In particular, the second optical assembly and the aperture stop are integrated into a single component, i.e., the cylindrical concave mirror 1603, with its concave surface facing the object plane 10. That is, the cylindrical concave mirror 1603 also functions as an aperture stop in the y-direction. The conjugate imaging element is a serrated grating 1602 arranged to face the image plane 20, and the one-dimensional optical element in the first optical assembly is a plano-convex cylindrical mirror 1601 arranged between the image plane 20 and the serrated grating 1602, with the planar side of the plano-convex cylindrical mirror 1601 facing the image plane 20 and the convex side of the plano-convex cylindrical mirror 1601 facing the serrated grating 1602. The polarizing beam splitting plate 1604 is obliquely disposed between the object plane 10 and the cylindrical concave mirror 1603 and between the serrated grating 1602 and the plano-convex cylindrical mirror 1606. The first polarizer 1605 is disposed between the object plane 10 and the polarizing beam splitting plate 1604 for converting light from the object plane 10 to p-polarized light. The second polarizer 1606 is disposed optically downstream of the plano-convex cylindrical mirror 1601 for blocking transmission of s-polarized light. The first quarter wave plate 1607 is disposed between the cylindrical concave mirror 1603 and the polarizing beam splitting plate 1604 for converting the light reflected back from the cylindrical concave mirror 1603 to s-polarized light. The second quarter wave plate 1608 is disposed between the polarizing beam splitting plate 1604 and the serrated grating 1602 for converting the light reflected back from the serrated grating 1602 to p-polarized light.

When the display portion 111 is disposed at or relayed to the object plane of the optical imaging module 1620, the light emitted from the display plane passes through the first polarizer 1605 and is converted to p-polarized light, passing through the polarizing beam splitting plate 1604 that transmits p-polarized light and reflects s-polarized light, thus the light emitted from the display plane transmits through the polarizing beam splitting plate 1604, passing through the first quarter wave plate 1607, and irradiating the cylindrical concave mirror 1603. The light returning from the cylindrical concave mirror 1603 passes through the first quarter wave plate 1607 again, converted to s-polarized light, and reflected by the polarizing beam splitting plate 1604, irradiating onto the serrated grating 1602 through the second quarter wave plate. The light reflected from the serrated grating 1602 passes through the second quarter wave plate 1608 again, converted to p-polarized light to transmit through the polarizing beam splitting plate 1604, irradiating onto the plano-convex cylindrical mirror 1606. Finally, the light passes through the plano-convex cylindrical mirror 1601 to form a floating image at the image plane 20 in the air. The second polarizer 1606 serves to allow only p-polarized light to transmit through so as to filter out stray light of s-polarized light, and cooperates with the second quarter wave plate 1608 when external light irradiates the serrated grating 1602 to eliminate impact of the external light.

In this way, points on the display portion 111 that are imaged through the optical imaging module 1620 along the x-direction have a relatively large image-side aperture angle, satisfying the binocular parallax condition, whereby a floating image can be formed at the image plane 20. Points on the display portion 111 that are imaged through the optical imaging module 1620 along the y-direction have a relatively small image-side aperture angle to obtain high imaging quality.

Sixth Example

Figure 17:
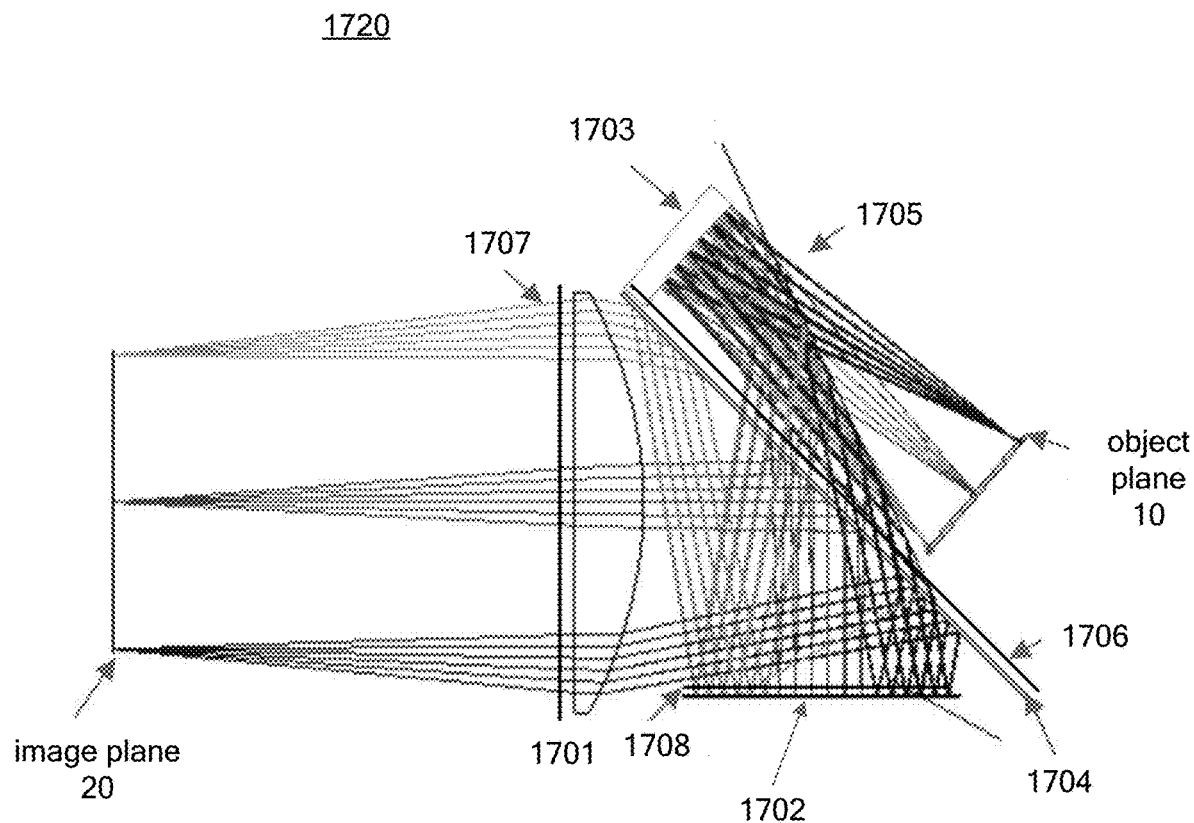
FIG. 17 illustrates a schematic diagram of an optical imaging module 1720 and propagation of light in the y-z plane according to a sixth example of the present invention.

FIG. 17 illustrates a schematic diagram of an optical imaging module 1720 and propagation of light in the y-z plane according to a sixth example of the present invention. Several details of the optical imaging module 1720 according to the sixth example are identical to those of the optical imaging module 120 as described above with respect to FIGS. 1-5B, and will not be repeated herein. The special features of the optical imaging module 1720 of the sixth example are mainly described below.

In this example, the optical imaging module 1720 may include a plano-convex cylindrical mirror 1701 (first optical assembly), a one-dimensional retroreflective screen 1702 (conjugate imaging element), a cylindrical concave mirror 1703 (second optical assembly and aperture stop), a polarizing beam splitting film 1704, a beam splitting mirror 1705, a first polarizer 1706, a second polarizer 1707 and a quarter wave plate 1708. In particular, the second optical assembly and the aperture stop are integrated into a single component, i.e., the cylindrical concave mirror 1703, with its concave surface facing the object plane 10. That is, the cylindrical concave mirror 1703 also functions as an aperture stop in the y-direction. The conjugate imaging element with a one-dimensional grating structure is the one-dimensional retroreflective screen 1702, and the one-dimensional optical element in the first optical assembly is the plano-convex cylindrical mirror 1701 arranged between the image plane and the polarizing beam splitting film 1704, with the planar side of the plano-convex cylindrical mirror 1701 facing the image plane 20 and the convex side of the plano-convex cylindrical mirror 1701 facing the polarizing beam splitting film 1704. The beam splitting mirror 1705 is obliquely disposed between the object plane 10 and the cylindrical concave mirror 1703 for transmitting the light from the object plane 10 to the cylindrical concave mirror 1703 and reflecting the light reflected back from the cylindrical concave mirror 1703 onto the one-dimensional retroreflective screen 1702. The polarizing beam splitting film 1704 is obliquely disposed between the beam splitting mirror 1705 and the one-dimensional retroreflective screen 1702 for passing p-polarized light while reflecting s-polarized light. The polarizing beam splitting film 1704 reflects the s-polarized light reflected back from the one-dimensional retroreflective screen 1702 to the plano-convex cylindrical mirror 1701. The first polarizer 1706 is disposed between the beam splitting mirror 1705 and the polarizing beam splitting film 1704 for converting the light from the object plane 10 to p-polarized light. The quarter wave plate 1708 is disposed between the polarizing beam splitting film 1704 and the one-dimensional retroreflective screen 1702 for converting the light reflected back from the one-dimensional retroreflective screen 1702 to s-polarized light. The second polarizer 1707 is disposed optically downstream of the plano-convex cylindrical mirror 1701 for passing s-polarized light.

When the display portion 111 is disposed at the object plane 10 of the optical imaging module 1720, the light emitted from the display plane passes through the beam splitting mirror 1705 to be irradiated onto the cylindrical concave mirror 1703, and is reflected by the concave mirror 1703 to be irradiated onto the beam splitting mirror 1705 again, and is reflected onto the first polarizer 1706, which is a polarizer for passing the light in the p-polarized state. The p-polarized light further passes through the polarizing beam splitting film (passing the p-light and reflecting the s-light) to be irradiated onto the quarter wave plate 1708, and the light is reflected by the one-dimensional retroreflective screen 1702 to pass through the quarter wave plate 1708 again to become s-polarized light; the s-polarized light is reflected by the polarizing beam splitting film 1704 to be irradiated onto the lens 1701, and emitted through the second polarizer 1707 to form a floating image in space. The second polarizer 1707 can transmit the s-polarized light. The directions of the absorption axes of the second polarizer 1707 and the first polarizer 1706 are orthogonal, which can prevent large-angle light emitted from the display plane from passing directly through the second polarizer 1707 and the first polarizer 1706 into human eyes and forming a ghost image.

In this way, points on the display portion 111 that are imaged through the optical imaging module 1720 along the x-direction have a relatively large image-side aperture angle, satisfying the binocular parallax condition, whereby a floating image can be formed at the image plane 20, and points on the display portion 111 that are imaged through the optical imaging module 1720 along the y-direction have a relatively small image-side aperture angle to obtain high imaging quality.

Figure 18:
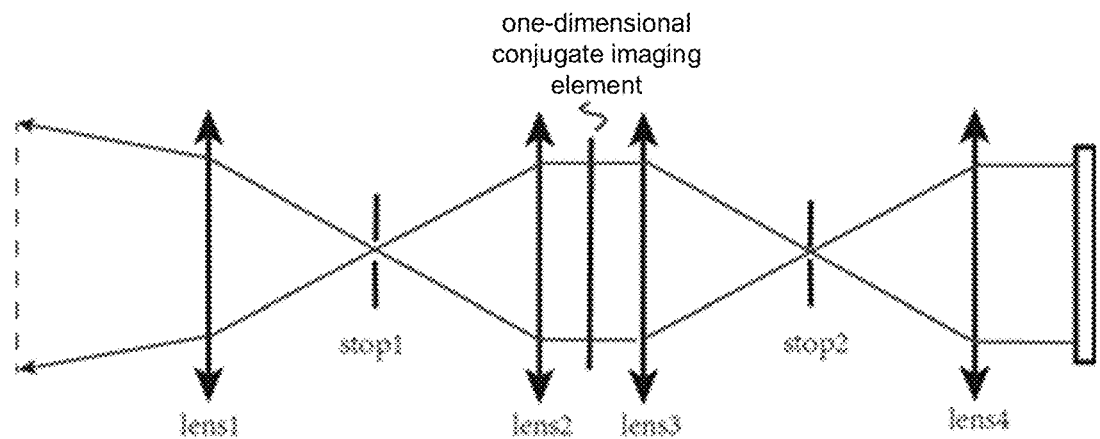
FIG. 18 illustrates a schematic diagram of erectly imaging in the y direction by an optical imaging module according to an optional embodiment.

Note that although the above mentioned embodiments and examples are depicted in a y-direction inverted imaging relationship, it should be clear to those skilled in the art that the splicing display apparatus according to the present invention may also be erect imaging in the y direction, for example by means of an additional y-direction flipping optical system as shown in FIG. 18.

Figure 19:
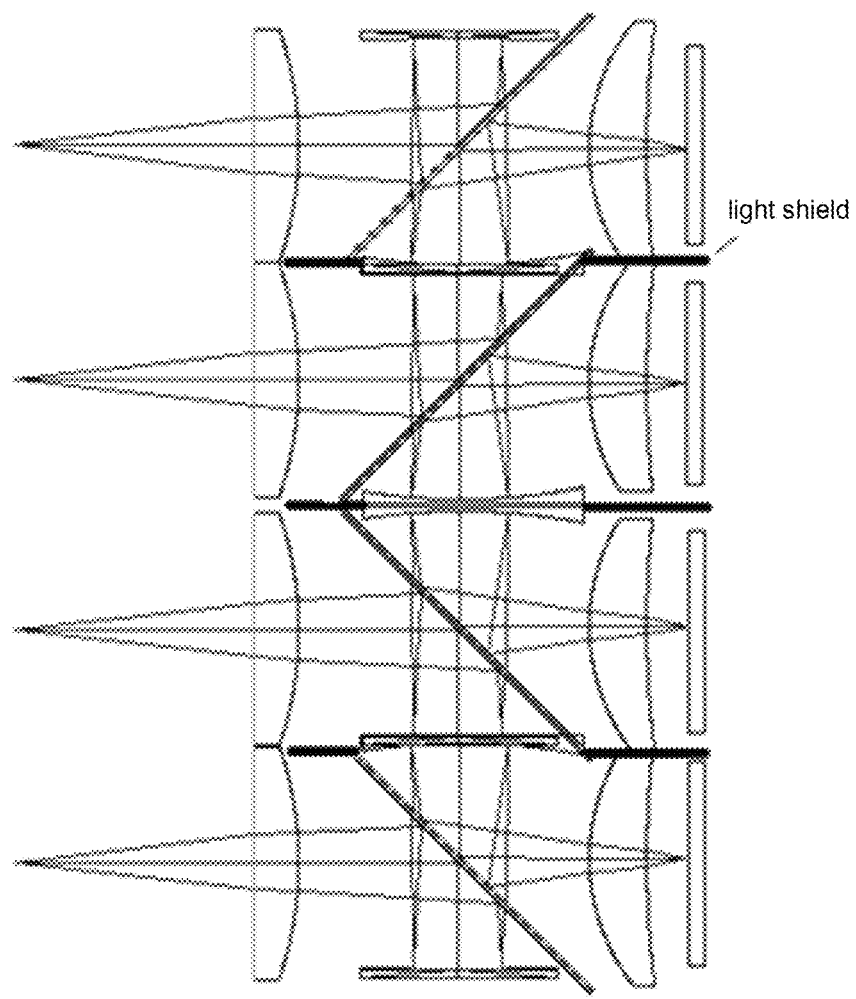
FIG. 19 illustrates a schematic diagram for providing a light shield.

It can be understood that light emitted from different display portions may enter an optical imaging unit adjacent to the corresponding optical imaging unit, causing image crosstalk and forming a ghost image. Therefore, in an optional embodiment of the present invention, as shown in FIG. 19, a light shield may be provided between adjacent display portions and/or adjacent optical imaging modules to prevent crosstalk between light of different modules.

According to another exemplary embodiment of the present invention, a multi-layer display device is also provided.

Figure 20:
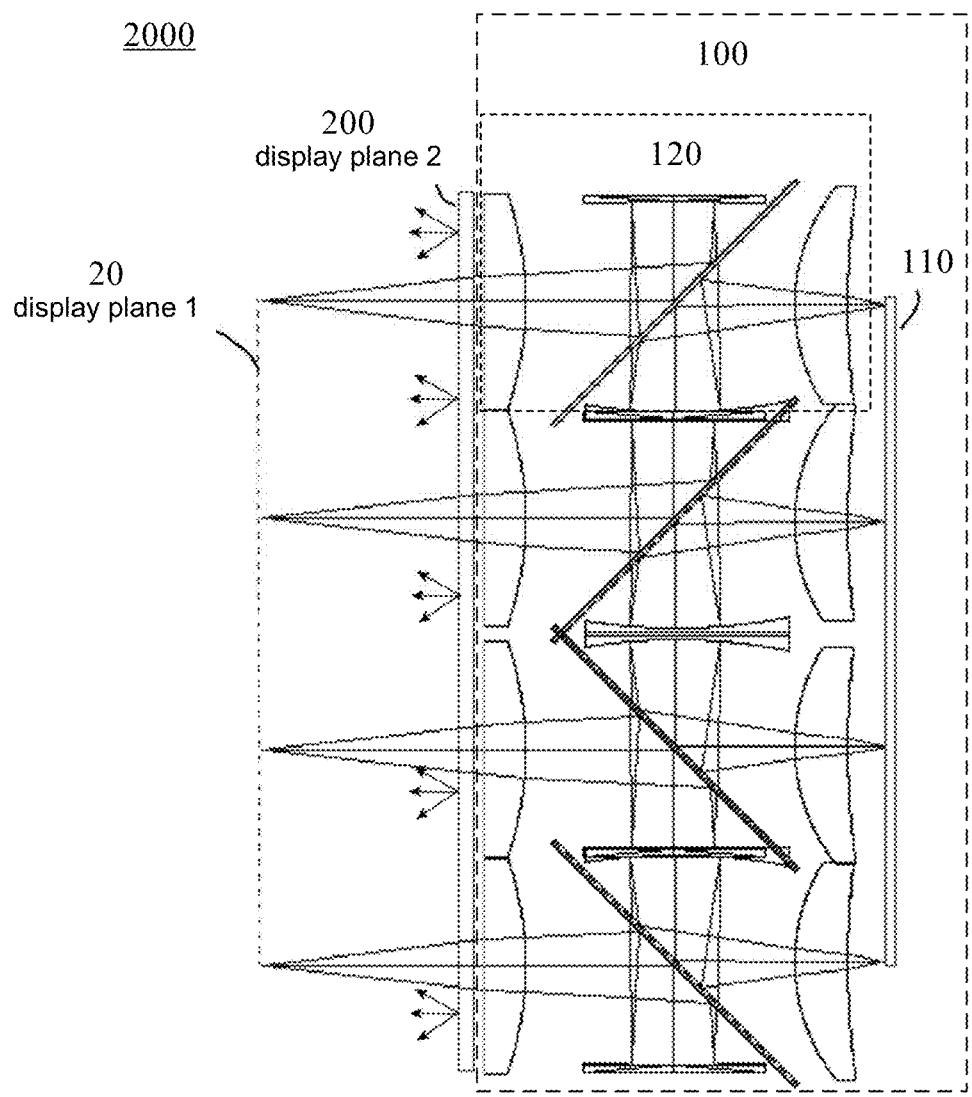
FIG. 20 illustrates a schematic diagram of a multi-layer display device 2000 according to an embodiment of the present invention.

FIG. 20 illustrates a schematic diagram of a multi-layer display device 2000 according to an embodiment of the present invention.

Figure 21:
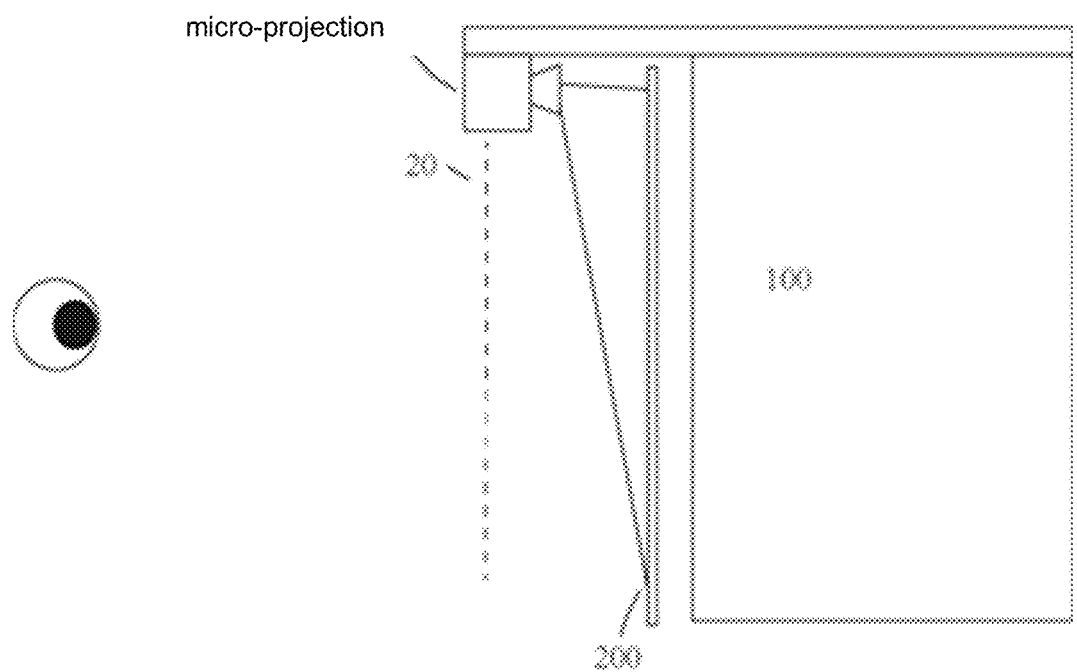
FIG. 21 illustrates a schematic diagram of a transparent display apparatus implemented by micro-projection.

The multi-layer display device 2000 may include the previously described splicing display apparatus 100 and a transparent display apparatus 200. The transparent display apparatus 200 may be provided on the light outgoing side (optically downstream) of the splicing display apparatus 100. The display plane of the transparent display apparatus 200 and the floating image plane 20 of the splicing display apparatus 100 are located at different positions, specifically located between the floating image plane 20 and the splicing display apparatus 100. The transparent display apparatus 200 may have a high transmittance, such as a transparent OLED/LED/LCD display or a film (slide). The transparent display apparatus 200 may also be accomplished by providing a transparent film (film haze less than 2%) in front of the splicing display apparatus 100 and projecting an image on the film through micro-projection, as shown in FIG. 21.

Figure 22:
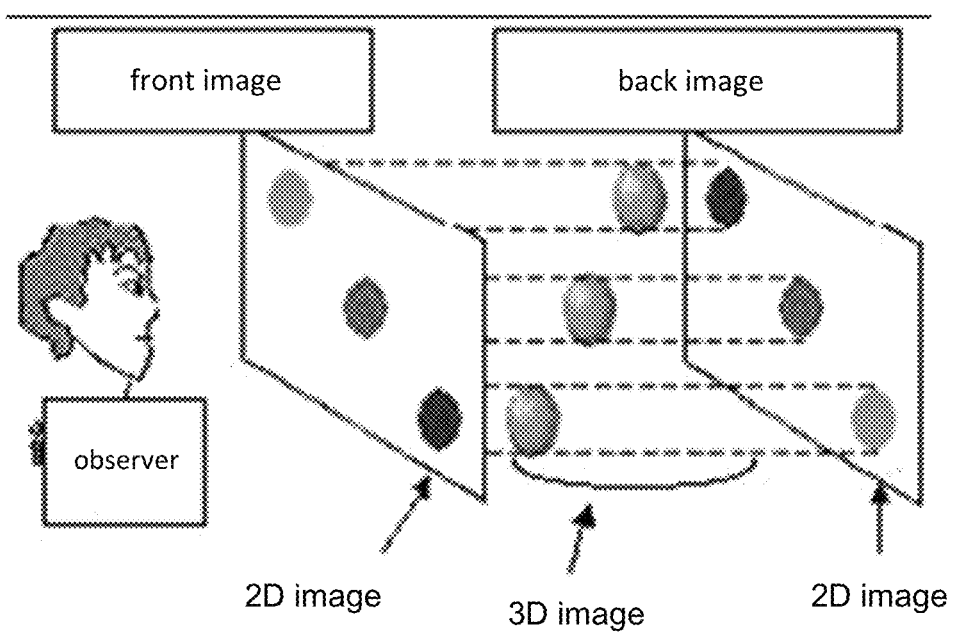
FIG. 22 illustrates a schematic diagram of naked-eye 3D display implemented by the multi-layer display device.

The multi-layer display device 2000 according to an exemplary embodiment of the present invention is described above. The multi-layer display device 2000 has a display plane 1 and a display plane 2. The splicing display apparatus 100 can form a floating image at the display plane 1 (image plane 20), and the transparent display apparatus 200 can display different information at the display plane 2. As such, secondary information may be displayed on the display plane 2 while important information may be presented at the display plane 1, thereby enhancing the efficiency and experience of people in obtaining information. Alternatively, images of the same size can be displayed on the display plane 1 and the display plane 2, and darkness and color differences can be caused by different distances between the object and the observer, so that the front and back object images can be overlapped together to make the observer have a stereoscopic impression, thus realizing naked-eye 3D display, as shown in FIG. 22.

Figure 23A:
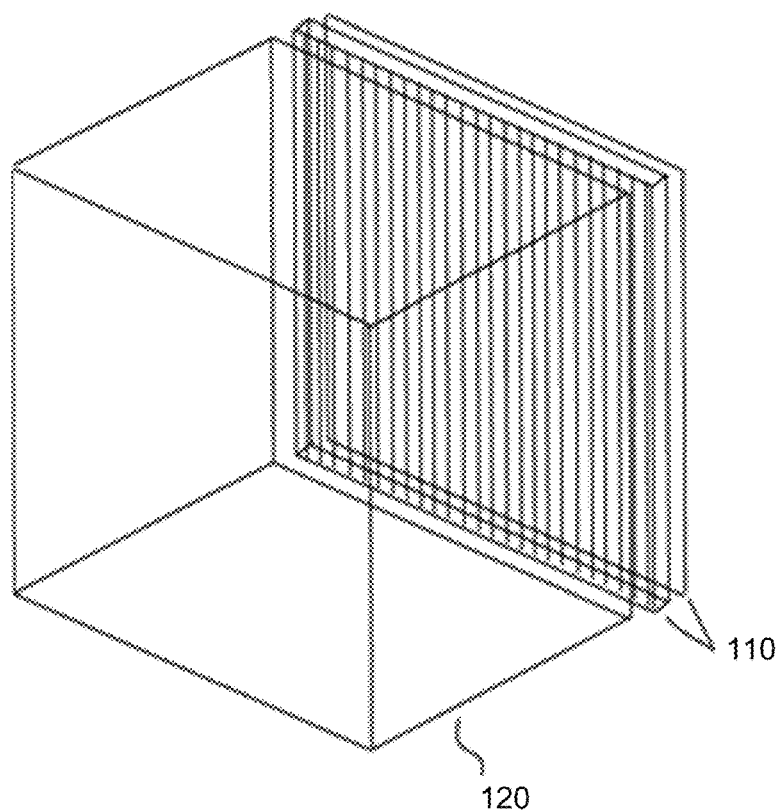
FIGS. 23A-23C illustrate descriptive schematic diagrams of a display module adopting a three-dimensional display.
Figure 23B:
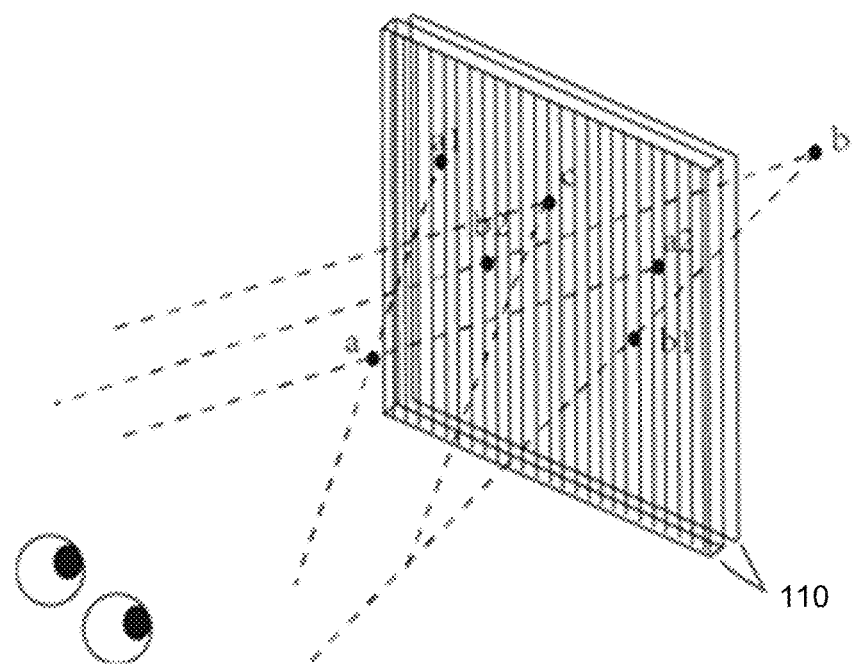

Optionally, the display module 110 may also be a naked-eye three-dimensional display, which may be a multi-view autostereoscopic display or a light field display. As shown in FIG. 23A, a typical naked-eye three-dimensional display is composed of a flat panel display and a micro-optical unit such as a micro-lens or a slit grating. The images with parallax generated by the flat panel display are sent to the left and right eyes of the observer after passing through the micro-optical unit, and stereoscopic impression can be generated by means of the binocular parallax effect of human eyes. As shown in FIG. 23B, a point "a1" on the display module 110 enters the right eye and a point "a2" on the display module 110 enters the left eye. The point seen by the human eyes is a point "a" due to the binocular parallax principle, which is in front of the screen. A point "b1" on the display screen enters the right eye and a point "b2" on the display screen enters the left eye. The point seen by the human eyes is a point "b" due to the binocular parallax principle, which is behind the screen. The left and right eyes see a point "c" on the screen together, so the observer feels that the position of the point "c" is on the screen. Therefore, the 3D image presented by the traditional naked-eye 3D display is a 3D image within a certain depth range in front of and behind the screen as the depth center. Since the human will focus his/her eyes on the physical screen of the three-dimensional display when watching, he/she cannot feel the floating three-dimensional image in space, which affects the experience.

Figure 23C:
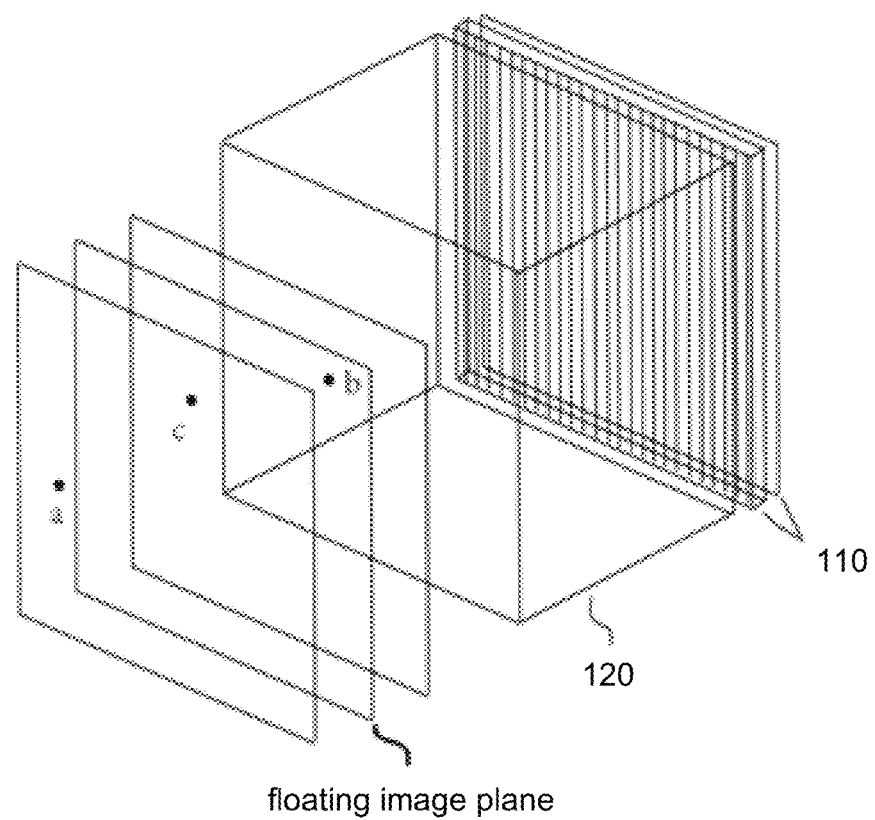

The display module 110 of the present invention can adopt a multi-view/light field display, which can solve the problem very well. The screen plane of the multi-view/light field display is projected into the space through the optical imaging module 120 of the present invention to form a floating image plane. By displaying a parallax image on the multi-view/light field display, a 3D image within a certain range in front of and behind the floating image plane as the depth center can just be formed in the space. As shown in FIG. 23C, on the floating image plane, the point "a" is on the front depth-of-field plane, the point "b" is on the back depth-of-field plane, and the point "c" is on the floating image plane of the display apparatus, so that the 3D image formed thereby is completely floating in the air and has a better experience of 3D effect.

The splicing display apparatus, the optical imaging module used therein, and the multi-layer display device according to exemplary embodiments of the present invention are described above in details. The invention has the following advantages: 1) the size of the optical element required by a single optical imaging module in the splicing display apparatus is small and easy to manufacture, which can effectively reduce the cost; 2) the display module with a specific number of display portions and a specific number of optical imaging modules can be adopted according to the need to realize the floating display of different sizes, splice-and-play, which is particularly beneficial to realize the large-size floating display; 3) the optical imaging module can be designed at one time, and the corresponding number of the same optical imaging module can be used according to the required size of floating image, without needing to design different optical imaging modules for different sizes of floating images; 4) the thickness of the splicing display apparatus is small, so as to realize lightweight and thinness. It belongs to an optical field three-dimensional display technology to employ the splicing display apparatus to realize reconstruction of the optical field of the plurality of display portions in the air. The light beam on the display portion(s) that is imaged through the optical imaging module along the x direction has a relatively large image-side aperture angle, which satisfies the binocular parallax condition, whereby floating display of the image can be realized.

It is to be understood that the above description is intended to be illustrative, and not restrictive. For example, the above-described embodiments (and/or aspects thereof) may be used in combination with each other. In addition, various modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

What is claimed is:

1. A splicing display apparatus, comprising:
   a display module configured to emit display light constituting a target image, the display module comprising a plurality of display portions arranged along a first direction, wherein each display portion is configured to display a corresponding portion of the target image; and
   a plurality of optical imaging modules configured to receive the display light emitted from the display module to form a plurality of floating sub-images in the air, wherein each of the plurality of display portions is disposed at an object plane of a corresponding optical imaging module of the plurality of optical imaging modules, and the display light emitted from each display portion presents a corresponding floating sub-image through the corresponding optical imaging module,
   wherein the plurality of floating sub-images constitute a complete floating image of the target image, and adjacent floating sub-images of the plurality of floating sub-images have overlapping splicing areas and have the same image content in the splicing areas.

2. The splicing display apparatus of claim 1, wherein the corresponding portion of the target image displayed on each display portion and the corresponding floating sub-image presented by the corresponding optical imaging module are in an inverted imaging relationship in the first direction.

3. The splicing display apparatus of claim 1, wherein the plurality of display portions include adjacent first and second display portions, wherein the first display portion and the second display portion respectively have repetitive display areas which are imaged in the same splicing area and have pixel points which display the same content in the respective repetitive display areas.

4. The splicing display apparatus of claim 3, wherein the pixel points displaying the same content in the repetitive display areas of the first display portion and the second display portion are imaged at the same image point in the same splicing area of the floating sub-image by the corresponding optical imaging module.

5. The splicing display apparatus of claim 3, wherein amplitude of a visual angle of the splicing area is able to be adjusted by changing a size of a corresponding repetitive display area.

6. The splicing display apparatus of claim 1, wherein the plurality of optical imaging modules have the same structure.

7. The splicing display apparatus of claim 1, wherein an image height in the first direction of the floating sub-image is greater than or equal to a maximum physical size of the corresponding optical imaging module in the first direction.

8. The splicing display apparatus of claim 1, wherein each of the plurality of optical imaging modules includes:
a conjugate imaging element having a one-dimensional grating structure for imaging in a second direction.

9. The splicing display apparatus of claim 8, wherein each of the plurality of optical imaging modules further includes:
an imaging assembly for imaging in the first direction, wherein a light convergence ability thereof in the first direction is greater than that in the second direction, the first direction and the second direction being orthogonal to a main optical axis of the floating display apparatus respectively.

10. The splicing display apparatus of claim 9, wherein the imaging assembly includes a first optical assembly and a second optical assembly, and the conjugate imaging element is disposed between the first optical assembly and the second optical assembly along the main optical axis.

11. The splicing display apparatus of claim 8, wherein each of the plurality of optical imaging modules further includes:
a beam splitting plate disposed obliquely between the display portion and the conjugate imaging element along a main optical axis.

12. The splicing display apparatus of claim 8, wherein an object plane and an image plane of each optical imaging module are arranged substantially symmetrically with respect to the conjugate imaging element.

13. The splicing display apparatus of claim 8, wherein the conjugate imaging element in at least one of the plurality of optical imaging modules is a reflective structure.

14. The splicing display apparatus of claim 1, wherein an image height in the second direction of the plurality of optical imaging modules is equal to an object height in the second direction, an image height in the first direction is greater than or equal to an object height in the first direction, and the second direction and the first direction are orthogonal to a main optical axis of the optical imaging module respectively.

15. The splicing display apparatus of claim 1, wherein an object plane and an image plane of each optical imaging module are arranged parallel to each other.

16. The splicing display apparatus of claim 1, wherein one or more of the display portions are disposed asymmetrically with respect to a main optical axis of the corresponding optical imaging module in the first direction, and one or more optical elements in the plurality of optical imaging modules have an asymmetrical structure with respect to the main optical axis in the first direction, such that the formed one or more floating sub-images are asymmetrical with respect to the main optical axis of the corresponding optical imaging module in the first direction.

17. The splicing display apparatus of claim 1, wherein a light shield is disposed between adjacent display portions and/or adjacent optical imaging modules to prevent crosstalk between light of different modules.

18. The splicing display apparatus of claim 1, wherein the display module is a three-dimensional display.

19. A multi-layer display device comprising:
a splicing display apparatus of claim 1; and
a transparent display apparatus disposed optically downstream of the splicing display apparatus, wherein a display plane of the transparent display apparatus is located at a position different from a position of the floating image.

20. The multi-layer display device of claim 19, wherein the transparent display apparatus comprises a transparent display or is implemented by projecting an image onto a transparent film.

* * * * *